US012119538B2

(12) United States Patent
Huang et al.

(10) Patent No.: US 12,119,538 B2
(45) Date of Patent: Oct. 15, 2024

(54) DISPLAY PANEL ASSEMBLY, MULTI-FUNCTION ASSEMBLY, TRANSCEIVER ASSEMBLY, AND WIRELESS COMMUNICATION APPARATUS

(71) Applicant: Yungu (Gu'an) Technology Co., Ltd., Hebei (CN)

(72) Inventors: Huan-Chu Huang, Taoyuan (CN); Jie Wu, Langfang (CN); Shuang Cui, Langfang (CN)

(73) Assignee: Yungu (Gu'an) Technology Co., Ltd., Langfang (CN)

( * ) Notice: Subject to any disclaimer, the term of this patent is extended or adjusted under 35 U.S.C. 154(b) by 0 days.

(21) Appl. No.: 18/650,559

(22) Filed: Apr. 30, 2024

(65) Prior Publication Data

US 2024/0283127 A1 Aug. 22, 2024

Related U.S. Application Data

(63) Continuation of application No. PCT/CN2023/136367, filed on Dec. 5, 2023.

(30) Foreign Application Priority Data

Jun. 13, 2023 (CN) .......................... 202310699642.4

(51) Int. Cl.
*H01Q 1/22* (2006.01)
*H01Q 1/38* (2006.01)
(Continued)

(52) U.S. Cl.
CPC ........... *H01Q 1/22* (2013.01); *H01Q 15/0006* (2013.01); *H04B 7/04013* (2023.05)

(58) Field of Classification Search
CPC .......... H01Q 1/22; H01Q 1/2283; H01Q 1/24; H01Q 1/243; H01Q 21/24; H01Q 21/06;
(Continued)

(56) References Cited

U.S. PATENT DOCUMENTS 10,516,218 B2 * 12/2019 Ding ...................... H01Q 19/18
10,824,208 B2 * 11/2020 Zhu ....................... H01Q 21/061
(Continued)

FOREIGN PATENT DOCUMENTS

CN 110278017 A 9/2019
CN 111614801 A 9/2020
(Continued)

OTHER PUBLICATIONS

Notification to Grant Patent Right for Invention issued on Jan. 9, 2024 in corresponding Chinese application No. 202310699642.4; 7 pages.
(Continued)

*Primary Examiner* — Tho G Phan
(74) *Attorney, Agent, or Firm* — Maier & Maier, PLLC

(57) ABSTRACT

A display panel assembly, a multi-function assembly, a transceiver assembly, and a wireless communication apparatus. The display panel assembly includes: a base plate; an antenna assembly arranged on the base plate and including one or more antenna units for receiving and transmitting wireless signals; and a metasurface assembly arranged on the base plate and including a plurality of metasurface units for enhancing performance of the wireless signals received and transmitted by the antenna units, in which the antenna assembly and the metasurface assembly each include a transparent structural layer.

20 Claims, 14 Drawing Sheets

(51) Int. Cl.
*H01Q 15/00* (2006.01)
*H04B 7/04* (2017.01)

(58) Field of Classification Search
CPC ...... H01Q 15/00; H01Q 15/0006; H01Q 1/50; H01Q 1/52; H01Q 1/521; H04B 7/04; H04B 7/04013
See application file for complete search history.

(56) References Cited

U.S. PATENT DOCUMENTS

| | | | |
|---|---|---|---|
| 11,557,825 B2* | 1/2023 | Foo | H01Q 1/243 |
| 11,843,171 B2* | 12/2023 | Saab | H04B 7/04013 |
| 11,956,059 B2* | 4/2024 | Meyer | H04B 7/145 |
| 11,984,946 B2* | 5/2024 | Khosravirad | H01Q 3/46 |
| 2022/0263220 A1 | 8/2022 | Huang et al. | |
| 2023/0282984 A1* | 9/2023 | Cheah | H01Q 1/523 343/702 |

FOREIGN PATENT DOCUMENTS

| | | |
|---|---|---|
| CN | 111834755 A | 10/2020 |
| CN | 211829191 U | 10/2020 |
| CN | 112612374 A | 4/2021 |
| CN | 114221120 A | 3/2022 |
| CN | 114256623 A | 3/2022 |
| CN | 114498053 A | 5/2022 |
| CN | 114566791 A | 5/2022 |
| CN | 115988113 A | 4/2023 |
| CN | 116018009 A | 4/2023 |
| CN | 116526136 A | 8/2023 |
| EP | 2887454 A1 | 6/2015 |
| GB | 2611383 A | 4/2023 |
| KR | 20220063129 A | 5/2022 |
| TW | I798118 B | 4/2023 |
| WO | 2023070575 A1 | 5/2023 |

OTHER PUBLICATIONS

Office Action issued on Sep. 25, 2023 in corresponding Chinese application No. 202310699642.4; 13 pages.
International Search Report issued on Feb. 22, 2024 in correspoponding application No. PCT/CN2023/136367; 5 pages.
Dong Jianshen, "Study on Broadband Reflectarray and Transmitarray Antennas", Xidian University, Jun. 2021, 90 pages.
Lingling Zhong et al., "Two Novel Directional Ultra Wide-band Antennas", Modern Radar, vol. 30, No. 7, Jul. 2008, 5 pages.
Ningning Sun et al., "Development of White OLED Display Devices", Henan Science and Technology, Mar. 2018, 4 pages.
Peng Ren et al., "Design and Implementation of Multi-beam Antenna Based on Air-ground Communication", Radio Engineering, 2020, vol. 50, No. 7, 5 pages.
Yue Qin et al., "Aperture-Shared Dual-Band Antennas With Partially Reflecting Surfaces for Base-Station Applications", IEEE Transactions On Antennas and Propagation, vol. 70, No. 5, May 2022, 13 pages.

* cited by examiner

DISPLAY PANEL ASSEMBLY, MULTI-FUNCTION ASSEMBLY, TRANSCEIVER ASSEMBLY, AND WIRELESS COMMUNICATION APPARATUS

CROSS REFERENCE TO RELATED APPLICATION

The present application is a continuation application of International Application No. PCT/CN2023/136367, filed on Dec. 5, 2023, which claims priority to Chinese Patent Application No. 202310699642.4 filed on Jun. 13, 2023, both of which are incorporated herein by reference in their entireties.

TECHNICAL FIELD

The present application relates to the technical field of display apparatus, and a display panel assembly, a multi-function assembly, a transceiver assembly, and a wireless communication apparatus.

BACKGROUND

The functions of the wireless communication apparatus (e.g., a cellular phone, a smart watch, etc.) are changing rapidly, and the market demand for the appearance and wireless communication performance of the apparatus is also increasing. How to improve the communication performance of the wireless communication apparatus has become an urgent technical problem to be solved.

SUMMARY

Embodiments of the present application provide a display panel assembly, a multi-function assembly, a transceiver assembly, and a wireless communication apparatus, aiming to improve the wireless communication performance of the display panel assembly.

Some embodiments of a first aspect of the present application provide a display panel assembly, including: a base plate; an antenna assembly arranged on the base plate and including one or more antenna units for receiving and transmitting wireless signals; and a metasurface assembly arranged on the base plate and including a plurality of metasurface units for enhancing performance of the wireless signals received and transmitted by the antenna units, in which the antenna assembly and the metasurface assembly each include a transparent structural layer.

Some embodiments of a second aspect of the present application provide a multi-function assembly, including: an antenna assembly including one or more antenna units for receiving and transmitting wireless signals; an intelligent reflecting surface including a reflecting assembly and a conductive layer, in which the conductive layer is arranged at a side of the reflecting assembly, and the reflecting assembly includes a plurality of reflecting units for reflecting wireless signals; and a metasurface assembly including a plurality of metasurface units for enhancing performance of the wireless signals received and transmitted by the antenna units, in which at least one of the reflecting units is reused as one of the metasurface unit and the antenna unit.

Some embodiments of a third aspect of the present application provide a wireless signal transceiver assembly, including: an antenna assembly including one or more antenna units for receiving and transmitting wireless signals; and a metasurface assembly including a plurality of metasurface units for enhancing performance of the wireless signals received and transmitted by the antenna units, in which the antenna assembly and the metasurface assembly each include a transparent structural layer.

Some embodiments of a fourth aspect of the present application further provide a wireless communication apparatus, including the display panel assembly according to any one of the embodiments of the first aspect, or the multi-function assembly according to any one of the embodiments of the second aspect, or the wireless signal transceiver assembly according to any one of the embodiments of the third aspect.

In the display panel assembly according to the embodiments of the present application, the display panel assembly includes a base plate, an antenna assembly, and a metasurface assembly. The antenna units in the antenna assembly are capable of receiving and transmitting wireless signals. The metasurface units of the metasurface assembly are capable of enhancing performance of the wireless signals received and transmitted by the antenna units, improving the receiving and transmitting performance of the antenna units, and thus improving the wireless communication performance of the display panel assembly. In addition, the antenna assembly and the metasurface assembly each include a transparent structural layer, which can reduce the effect of the antenna assembly and the metasurface assembly on the display of the display panel assembly.

BRIEF DESCRIPTION OF THE DRAWINGS

Other features, objects and advantages of the present application will become more apparent from reading the following detailed description of the non-limiting embodiments with reference to the accompanying drawings, in which the same or similar reference numerals indicate the same or similar features.

DETAILED DESCRIPTION

Figure 1:
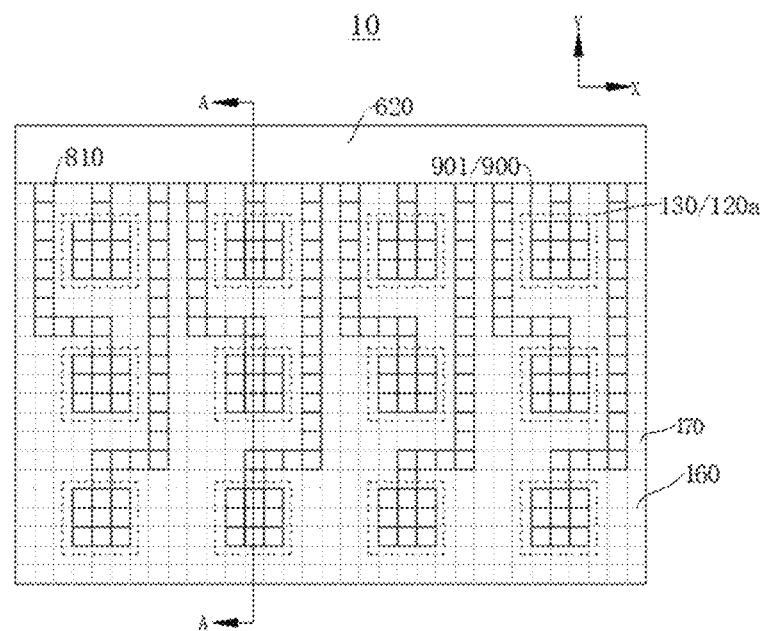
FIG. 1 shows a schematic structural diagram of a display panel assembly according to an embodiment of the first aspect of the present application.

In the description of the present application, "plurality" means two or more, unless otherwise indicated; the orientation or position relationships indicated by terms "up", "down", "left", "right", "inside", "outside", and the like are only for ease of describing the present application and simplifying the description, and do not intend to indicate or imply that the referred device or element must be in a particular orientation, constructed and operated in a particular orientation, and thus these terms should not to be understood as limiting the present application. Furthermore, terms "first", "second", and the like are only for descriptive purposes and should not to be understood as indicating or implying relative importance.

Orientation terms in the following description are understood as the orientations shown in the drawings, and do not limit the specific structure of the embodiments of the present application. In the description of the present application, unless otherwise expressly specified and limited, terms "mount", "connect", and their derivatives shall be broadly understood as, for example, being fixedly connected, removably connected, or integrally connected; and these terms may indicate a direct connection or an indirect connection. For those of ordinary skill in the art, the specific meaning of the above terms in the present application may be understood based on the context.

With the development of display technology and wireless communication technology, the demand for the communication performance of the wireless communication apparatus is becoming higher and higher. Intelligent Reflecting Surface (IRS) is an important communication design that has gained a lot of attention and been extensively studied nowadays, the IRS can change the direction and number of the reflected beams incident from a wireless signal source by regulating the amplitude and phase of the electrical signals on a plurality of reflecting units in the surface (i.e., by changing the electrical loads of the reflecting units), and thus can maintain the reflected beams as one reflected beam or divide the reflected beams into a plurality of reflected beams, so as to regulate the direction to focus on one or more communication targets, therefore the wireless communication quality can be significantly improved. The IRS may be disposed on the interior or exterior walls of the building. In addition, the antenna is also an important functional component for transmitting and receiving wireless signals in the wireless communication apparatus.

The IRS is generally composed of a three-layer structure, in which the surface layer is a reflecting unit, which is a conductor structure and used to reflect wireless signals. A metal plate such as a copper plate is under the reflecting unit and used to block and reflect the wireless signals. A control circuit board is arranged at a side of the metal plate away from the reflecting unit, and the control circuit on the control circuit board is electrically connected with the reflecting unit and used to regulate the signal amplitude and phase of each reflecting unit, so as to control the direction and number of the reflected beams. Nonetheless, this three-layer structure is not transparent for human eyes, and thus the IRS is not transparent for human eyes, either.

A metasurface is a plane design in which the conductive pattern is periodical, which can improve electromagnetic properties, and thus the metasurface may be utilized to improve antenna performance.

In order to better understand the present application, the display panel assembly, the multi-function assembly, the transceiver assembly, and the wireless communication apparatus according to the embodiments of the present application are described in detail below in conjunction with FIGS. 1 to 42.

Figure 2:
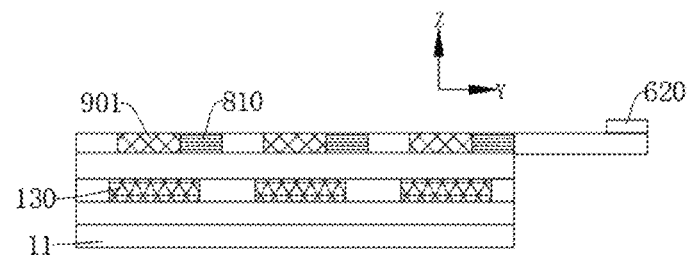
FIG. 2 shows a sectional view at A-A in FIG. 1.

Reference is made to FIGS. 1 to 2 together, in which FIG. 1 shows a schematic structural diagram of a display panel assembly 10 according to an embodiment of the present application, and FIG. 2 shows a sectional view at A-A in FIG. 1.

As shown in FIGS. 1 and 2, some embodiments of the first aspect of the present application provide a display panel assembly 10, including: a base plate 11, an antenna assembly 900, and a metasurface assembly. The antenna assembly 900 is arranged on the base plate 11 and includes one or more antenna units 901 for receiving and transmitting wireless signals; and the metasurface assembly is arranged on the base plate 11 and includes a plurality of metasurface units 130 for enhancing performance of the wireless signals received and transmitted by the antenna units 901, in which the antenna assembly 900 and the metasurface assembly each include a transparent structural layer.

In the display panel assembly 10 according to the embodiments of the present application, the display panel assembly 10 includes the base plate 11, the antenna assembly 900, and the metasurface assembly. The antenna units 901 in the antenna assembly 900 are capable of receiving and transmitting wireless signals. The metasurface units 130 of the metasurface assembly are capable of enhancing performance of the wireless signals received and transmitted by the antenna units 901, improving the receiving and transmitting performance of the antenna units 901, and thus improving the wireless communication performance of the display panel assembly 10. In addition, the antenna assembly 900 and the metasurface assembly each include a transparent structural layer, which can reduce the effect of the antenna assembly 900 and the metasurface assembly on the display of the display panel assembly 10.

Optionally, both the antenna unit 901 and the metasurface unit 130 are configured to receive and transmit wireless signals, and the metasurface unit 130 differs from the antenna unit 901 in that: the antenna unit 901 is connected with a feed-in and connected to a radio frequency circuit through the feed-in; while the metasurface unit 130 is not directly electrically connected with the radio frequency circuit and the antenna unit 901. Optionally, the metasurface unit 130 is suspended within the display panel assembly 10, which means that the metasurface unit 130, when used to enhance the performance of the antenna unit 901 for receiving and transmitting wireless signals, is not directly electrically connected with other components.

The transparent structural layer may be set in various ways, and for example, as shown in FIG. 1, the transparent structural layer includes grid metal wirings. For example, the transparent structural layer is a mesh layer including a plurality of grid strips 160 and transmitting portions 170 enclosed by the plurality of grid strips 160. For example, the antenna assembly 900 and/or the metasurface assembly are arranged in the mesh layer, and at least a portion of the grid strips 160 of the mesh layer form the antenna units 901 and/or the metasurface units 130. Within the same mesh layer, the grid strips 160 used as the antenna units 901 and/or the metasurface units 130 are insulated from other grid strips 160 located at other locations, so as to avoid short-circuit connection between the antenna units 901 and/or the metasurface units 130 and the grid strips 160. FIG. 1 illustrates an example of the grid structure with light-colored gray lines, and further illustrates the locations of the antenna units 901 and/or the metasurface units 130 with black lines.

Optionally, the display panel assembly 10 further includes a pixel defining layer including one or more pixel defining portions and one or more pixel openings enclosed by the pixel defining portions, the transparent structural layer is located at a side of the pixel defining layer away from the base plate, and at least a portion of the orthographic projection of the grid strip 160 on the base plate 11 is within an orthographic projection of the pixel defining portion on the base plate 11. Light-emitting units are arranged within the pixel openings to cause the display panel assembly 10 to emit light and display.

In these optional embodiments, at least a portion of the orthographic projection of the grid strip 160 on the base plate 11 is within the orthographic projection of the pixel defining portion on the base plate 11, so that this portion of the grid strip 160 does not affect the light emitting of the light-emitting units, which can improve the display effect of the display panel assembly 10.

Optionally, the entire orthographic projection of the grid strip 160 on the base plate 11 is within the orthographic projection of the pixel defining portion on the base plate 11.

Figure 3:
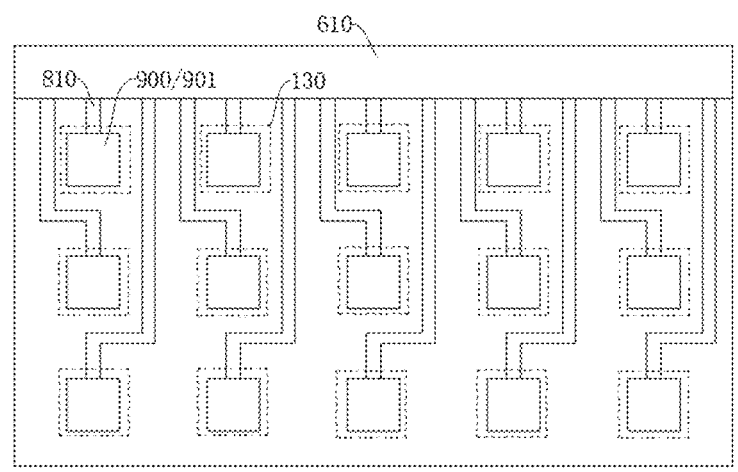
FIG. 3 shows a schematic structural diagram of a display panel assembly according to another embodiment of the first aspect of the present application.

In some other optional embodiments, as shown in FIG. 3, the transparent structural layer includes a light-transmitting conductive layer including a light-transmitting conductive material such as indium tin oxide (ITO), indium zinc oxide (IZO), and the like, such that the transparent structural layer is conductive and light-transmitting. In these optional embodiments, the antenna assembly 900 and/or the metasurface assembly include a transparent structural layer, i.e., the material of at least a portion of the antenna units 901 and/or the metasurface units 130 includes a light-transmitting conductive material, so that at least a portion of the antenna units 901 and/or the metasurface units 130 are light-transmitting and conductive, which reduces the effect of the antenna units 901 and/or the metasurface units 130 on the display of the display panel assembly 10.

Optionally, the light transmittance of the transparent structural layer is greater than or equal to 50%, and for example, greater than or equal to 60%, 62%, 65%, 70%, 78%, 80%, 86%, or even 90%, so as to further reduce the effect of the antenna units 901 and/or the metasurface units 130 on the display of the display panel assembly 10.

Optionally, the transparent structural layer included in the antenna assembly 900 and the transparent structural layer included in the metasurface assembly may be set in a same way or in different ways. For example, the transparent structural layer included in the antenna assembly 900 and the transparent structural layer included in the metasurface assembly each include a mesh layer, or the antenna assembly 900 and the metasurface assembly each include a light-transmitting conductive material. Alternatively, the transparent structural layer included in the antenna assembly 900 includes a mesh layer, and the transparent structural layer included in the metasurface assembly includes a light-transmitting conductive material. Alternatively, the transparent structural layer included in the antenna assembly 900 includes a light-transmitting conductive material, and the transparent structural layer included in the metasurface assembly includes a mesh layer.

Optionally, the display panel assembly 10 further includes a conductive functional structure, and the antenna units 901 and/or the metasurface units 130 are arranged in the same layer as the conductive functional structure. Optionally, the conductive functional structure may be a touch control electrode structure of the display panel, and the antenna units 901 and/or the metasurface units 130 and the touch control electrode structure are arranged in a touch control layer. Alternatively, the conductive functional structure may be a pixel electrode and/or a common electrode of the display panel, and the antenna units 901 and/or the metasurface units 130 and the pixel electrode are arranged in a pixel electrode layer. Alternatively, a common electrode layer includes a plurality of common electrodes that are insulated from each other, and the antenna units 901 and/or the metasurface units 130 and the common electrodes are arranged in the common electrode layer.

Figure 4:
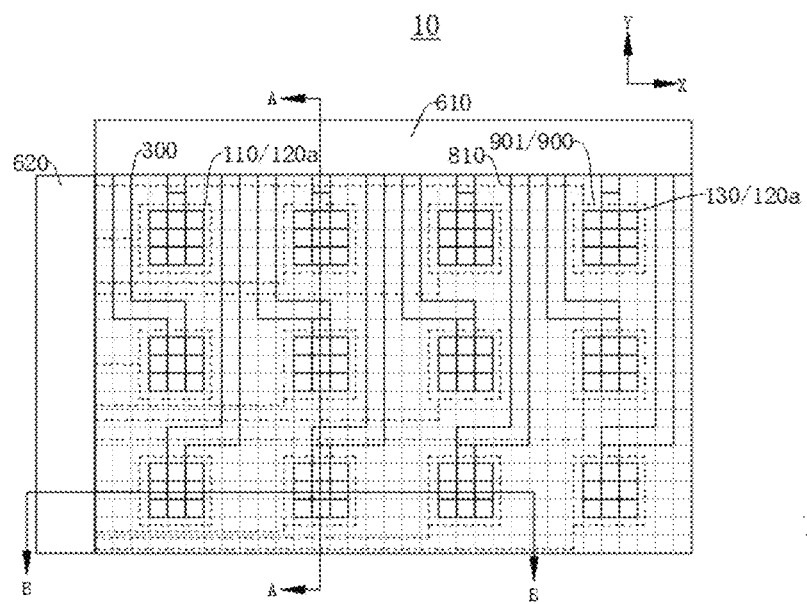
FIG. 4 shows a schematic structural diagram of a display panel assembly according to yet another embodiment of the first aspect of the present application.
Figure 5:
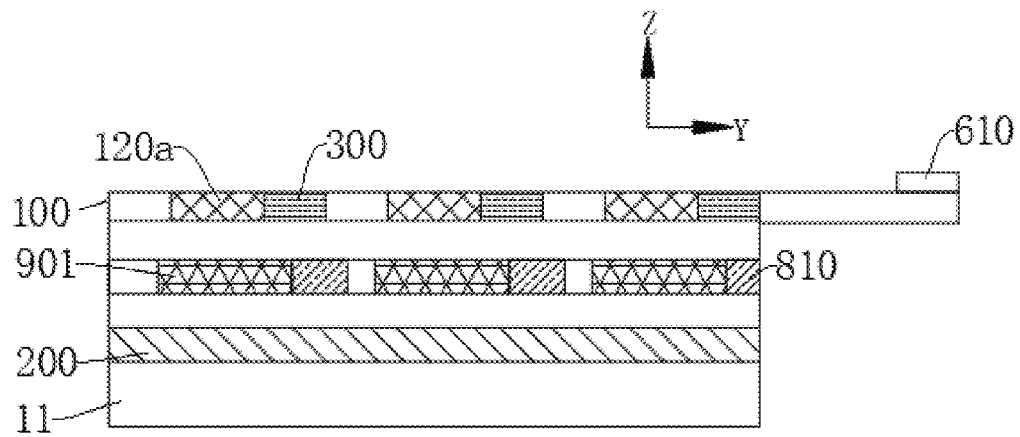
FIG. 5 shows a sectional view at A-A in FIG. 4.
Figure 6:
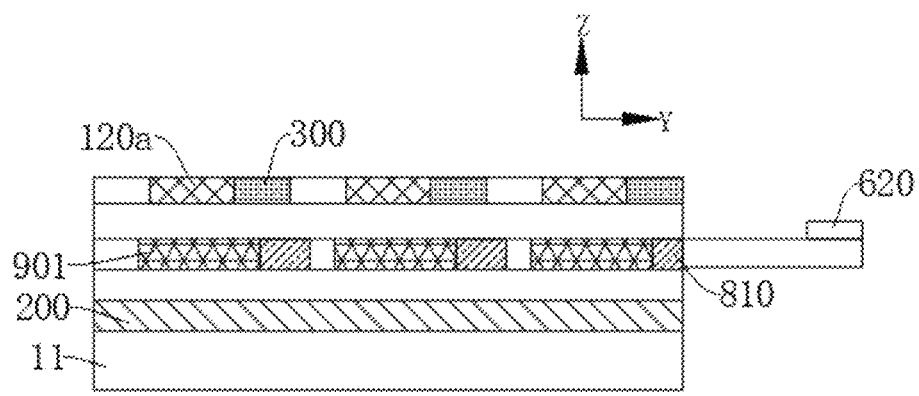
FIG. 6 shows a sectional view at B-B in FIG. 4.

In some optional embodiments, as shown in FIGS. 4 to 6, the display panel assembly 10 further includes an intelligent reflecting surface including a reflecting assembly and a conductive layer 200, the conductive layer 200 is arranged at a side of the reflecting assembly facing the base plate 11, the reflecting assembly includes a plurality of reflecting units 110 for reflecting wireless signals; in which at least one of the reflecting units 110 is reused as at least one of the metasurface units 130, and/or at least one of the reflecting unit 110 is reused as at least one of the antenna units 901. The conductive layer 200 is used as the above metal plate in the IRS to block and reflect wireless signals.

In the display panel assembly 10 according to the embodiments of the present application, the reflecting units 110 of the reflecting assembly can reflect wireless signals, so that the display panel assembly 10 can not only receive and transmit wireless signals through the antenna units 901, but also reflect wireless signals through the reflecting units 110, so as to enrich the wireless communication function of the display panel assembly 10. The reflecting unit 110 is reused as one of the metasurface unit 130 and the antenna unit 901, which can simplify the structure of the display panel assembly 10. The conductive layer 200 can block signals incident by two adjacent reflecting units 110 to support the normal operation of the intelligent reflecting surface.

If the reflecting unit 110 is reused as the metasurface unit 130, the reflecting unit 110 has both the reflecting function and the metasurface function, i.e., the reflecting unit 110 can be used as the intelligent reflecting surface to reflect wireless signals emitted from outside toward the display panel assembly 10, and the reflecting unit 110 can further enhance the antenna signals received and transmitted by the antenna units 901. If the reflecting unit 110 is reused as the antenna unit 901, the reflecting unit 110 has the reflecting function and is able to receive and transmit wireless signals, i.e., the reflecting unit 110 can be used as the intelligent reflecting surface to reflect wireless signals emitted from outside toward the display panel assembly 10, and the reflecting unit 110 can further receive and transmit wireless signals.

In some optional embodiments, reference is still made to FIGS. 4 to 6, at least one of the reflecting units 110 and at least one of the metasurface units 130 are reused as a first multi-function unit 120*a*, i.e., at least one reflecting unit 110 and at least one metasurface unit 130, as a whole, form a first multi-function unit 120*a*, and the orthographic projection of at least one first multi-function unit 120*a* on the base plate 11 at least partially overlaps the orthographic projection of the antenna unit 901 on the base plate 11. FIG. 1 illustrates the locations of the antenna units 901 with dashed lines.

In these optional embodiments, the first multi-function unit 120*a* has both the reflecting function and the metasurface function, and at least one first multi-function unit 120*a* overlaps the antenna unit 901, so that the first multi-function unit 120*a* can better enhance the receiving and transmitting performance of the antenna unit 901.

Optionally, the display panel assembly 10 includes a control line 300 and a radio frequency line 810, in which the radio frequency line 810 is configured to connect the antenna unit 901 to a radio frequency circuit 620, and the control line 300 is configured to connect the reflecting unit 110 to a control circuit 610. FIG. 4 illustrates the location of the radio frequency line 810 with dashed line. Optionally, the control circuit 610 may be arranged in the display panel assembly 10. Alternatively, when the display panel assembly 10 is used in a wireless communication apparatus, the control circuit 610 is arranged in the wireless communication apparatus. Optionally, the radio frequency circuit 620 may be arranged in the display panel assembly 10. Alternatively, when the display panel assembly 10 is used in a wireless communication apparatus, the radio frequency circuit 620 is arranged in the wireless communication apparatus. Optionally, the first multi-function unit 120*a* is connected to the control circuit 610 via the control line 300 to be reused as the reflecting unit 110, and the first multi-function unit 120*a*, when reused as the metasurface unit 130, is electrically disconnected from the control circuit 610. That is, the first multi-function unit 120*a* in the metasurface operating mode is not directly electrically connected with the control circuit 610 and the radio frequency circuit 620, the metasurface unit 130 is not directly electrically connected with the radio frequency circuit 620, while the antenna unit 901 is electrically connected with the radio frequency circuit 620 via the radio frequency line 810.

Reference is still made to FIG. 1, the radio frequency wire 810 is formed by a grid structure and include a plurality of metal wires extending in different directions. Alternatively, as shown in FIG. 4, the radio frequency line 810 is formed by two metal wires in parallel. In other embodiments, the radio frequency line 810 may include only one wire, or include a plurality of metal wires, etc., as long as the radio frequency line 810 can be connected to the antenna unit 901 and the radio frequency circuit 620. Similarly, the other wires (e.g., the control line 300) may also be set in various ways.

If the reflecting unit 110 and the metasurface unit 130 are reused as the first multi-function unit 120*a*, the reflecting assembly and the metasurface assembly are arranged in a same layer. The location of the first multi-function unit 120*a* may be set in various ways, and for example, the first multi-function unit 120*a* may be arranged at a side of the antenna assembly 900 facing or away from the base plate 11.

In some optional embodiments, as shown in FIGS. 5 and 6, the first multi-function unit 120a is located at a side of the antenna unit 901 facing a display surface of the display panel assembly 10. That is, the first multi-function unit 120a is located at a side of the antenna unit 901 away from the base plate 11. When the first multi-function unit 120a is in the operating state of the reflecting unit 110 and used to reflect wireless signals, it can be avoided that the first multi-function unit 120a is blocked by the antenna unit 901, so as to ensure the normal operation of the first multi-function unit 120a.

Optionally, the first multi-function units 120a and the antenna units 901 may be arranged in one-to-one correspondence, i.e., the orthographic projection of the first multi-function unit 120a on the base plate 11 at least partially overlaps the orthographic projection of the antenna unit 901 on the base plate 11, so that each of the antenna units 901 can be enhanced by the first multi-function unit 120a.

In other embodiments, the first multi-function units 120a and the antenna units 901 may be arranged in one-to-many or many-to-one correspondence, i.e., a same first multi-function unit 120a may be arranged corresponding to a plurality of antenna units 901, and the orthographic projection of the first multi-function unit 120a on the base plate 11 at least partially overlaps the orthographic projection of the plurality of antenna units 901 on the base plate 11. Alternatively, a plurality of first multi-function units 120a may be arranged corresponding to a same antenna unit 901, and the orthographic projection of the plurality of first multi-function units 120a on the base plate 11 is within the orthographic projection of the antenna unit 901 on the base plate 11.

In yet some other embodiments, for a plurality of first multi-function units 120a, the orthographic projection of some of the first multi-function units 120a on the base plate 11 at least partially overlaps the orthographic projection of the antenna unit 901 on the base plate 11, and the orthographic projection of some other of the first multi-function units 120a on the base plate 11 is staggered from the orthographic projection of the antenna unit 901 on the base plate 11, as long as the orthographic projection of at least one of the first multi-function units 120a on the base plate 11 at least partially overlaps the orthographic projection of the antenna unit 901 on the base plate 11.

Optionally, the shapes and sizes of the orthographic projections of a plurality of first multi-function units 120a on the base plate 11 may be the same or different.

Figure 7:
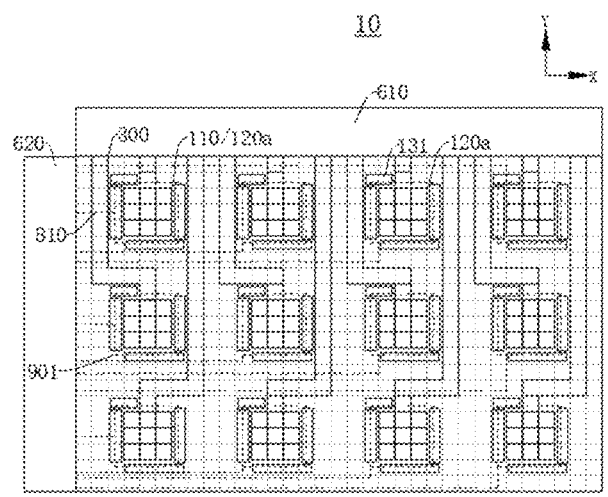
FIG. 7 shows a schematic structural diagram of a display panel assembly according to another embodiment of the first aspect of the present application.

In some optional embodiments, reference is still made to FIG. 7, the metasurface assembly further includes one or more auxiliary metasurface units 131 located at at least one side of a periphery of the first multi-function unit 120a. The auxiliary metasurface units 131 and the first multi-function unit 120a are configured to cooperatively enhance the wireless signals received and transmitted by the antenna unit 901, so as to further facilitate the metasurface assembly to increase the performance of the antenna assembly 900.

Optionally, at least one auxiliary metasurface unit 131 is arranged at the periphery of at least one of the first multi-function units 120a. Optionally, at least one auxiliary metasurface unit 131 is arranged at the periphery of each of the first multi-function units 120a. Optionally, two or more auxiliary metasurface units 131 are arranged at intervals at the periphery of each of the first multi-function units 120a. Optionally, the two or more auxiliary metasurface units 131 arranged at the periphery of each of the first multi-function units 120a are of the same arrangement, so that the metasurface assembly achieves similar performance increase on each of the antenna units 901.

Optionally, an orthographic projection of the auxiliary metasurface unit 131 on the base plate 11 at least partially overlaps the orthographic projection of the antenna unit 901 on the base plate 11, so as to facilitate the auxiliary metasurface unit 131 to increase the performance of the antenna unit 901.

Optionally, a plurality of auxiliary metasurface units 131 arranged at the peripheral of the same first multi-function unit 120a may be of the same or different shapes and sizes.

Optionally, the auxiliary metasurface units 131 and the first multi-function units 120a are arranged in a same layer, so that the auxiliary metasurface units 131 and the first multi-function units 120a can be manufactured in a same process step to simplify the manufacturing process of the display panel assembly 10.

Figure 8:
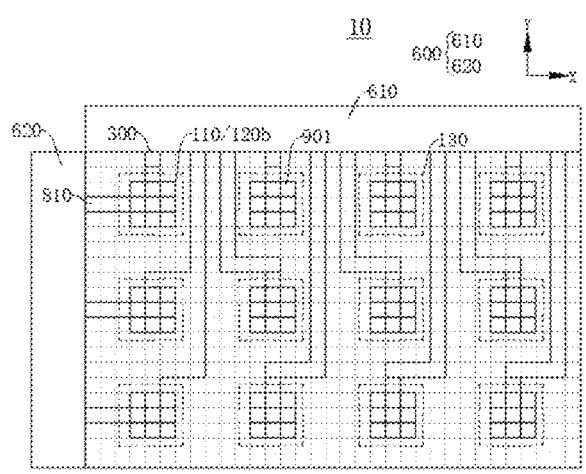
FIG. 8 shows a schematic structural diagram of a display panel assembly according to yet another embodiment of the first aspect of the present application.
Figure 9:
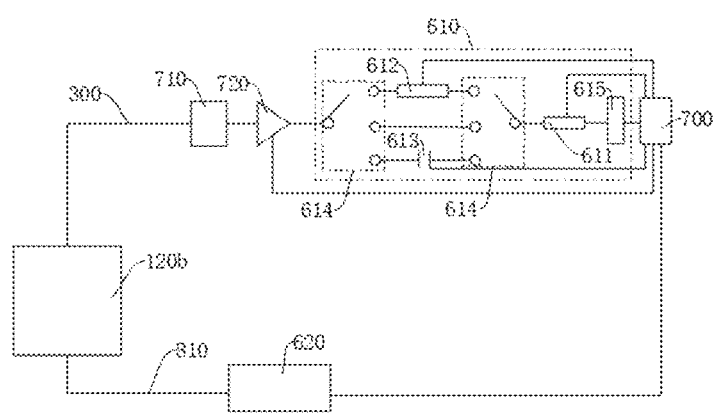
FIG. 9 shows a schematic structural diagram of a circuit of a display panel assembly according to an embodiment of the first aspect of the present application.

In some other optional embodiments, as shown in FIGS. 8 and 9, at least one of the reflecting units 110 and at least one of the antenna units 901 are reused as a second multi-function unit 120b. That is, the second multi-function unit 120b has the reflecting function and is able to receive and transmit wireless signals, the second multi-function unit 120b can be used as the reflecting surface to reflect wireless signals emitted from outside toward the display panel assembly 10, and the second multi-function unit 120b can further be used as the antenna to receive and transmit wireless signals. Therefore, the second multi-function unit 120b can be connected to the control circuit 610 through the control line 300 and connected to the radio frequency circuit 620 through the radio frequency line 810. FIG. 5 illustrates the locations of the metasurface units 130 with dashed lines.

Optionally, in FIG. 8, the control line 300 may be formed by a plurality of metal wires extending in different directions, or the control line 300 may include a single metal wire, as long as the control line 300 can electrically connect the second multi-function unit 120b to the control circuit 610.

If the reflecting unit 110 and the antenna unit 901 are reused as the second multi-function unit 120b, the second multi-function unit 120b and the metasurface assembly may be arranged in a same layer or in different layers.

Figure 10:
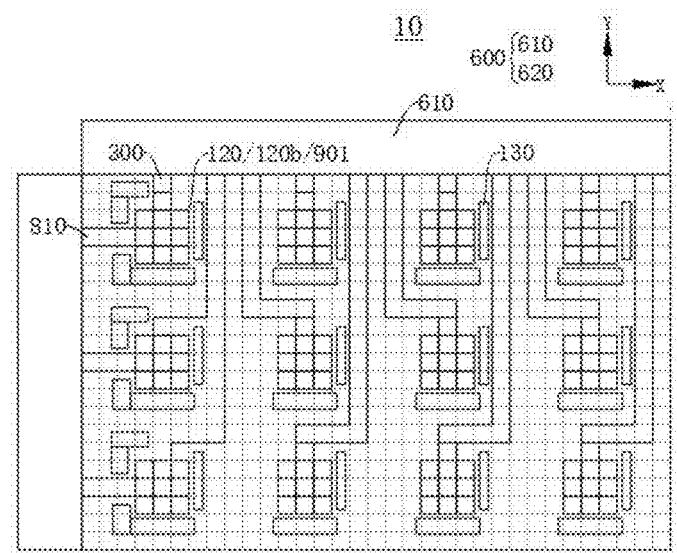
FIG. 10 shows a schematic structural diagram of a display panel assembly according to yet another embodiment of the first aspect of the present application.
Figure 11:
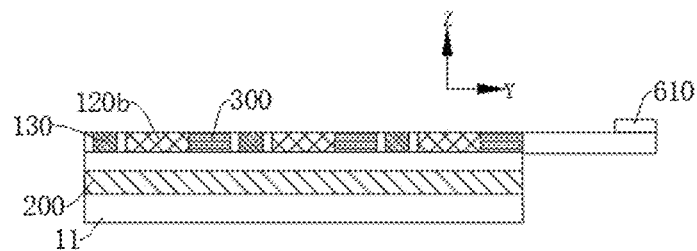
FIG. 11 shows a sectional view at A-A in FIG. 4 in another example.

For example, as shown in FIGS. 10 and 11, the second multi-function unit 120b and the metasurface assembly are arranged in the same layer, and the metasurface unit 130 is located at at least one side of the periphery of the second multi-function unit 120b. Optionally, at least one metasurface unit 130 is arranged at the periphery of at least one second multi-function unit 120b. Optionally, at least one metasurface unit 130 is arranged at the periphery of each second multi-function unit 120b. Optionally, a plurality of metasurface units 130 are arranged at intervals at the periphery of each second multi-function unit 120b. Optionally, the plurality of metasurface units 130 arranged at the periphery of each second multi-function unit 120b are of the same arrangement, so that the metasurface assembly achieves similar performance increase on each second multi-function unit 120b.

In some other optional embodiments, as shown in FIGS. 8 and 9, the second multi-function unit 120b and the metasurface assembly are arranged in different layers, and thus the orthographic projection of at least one second multi-function unit 120b on the base plate 11 at least partially overlaps the orthographic projection of at least one metasurface unit 130 on the base plate 11, so that the metasurface unit 130 can enhance the performance of the wireless signals received and transmitted by the second multi-function unit 120b.

Figure 12:
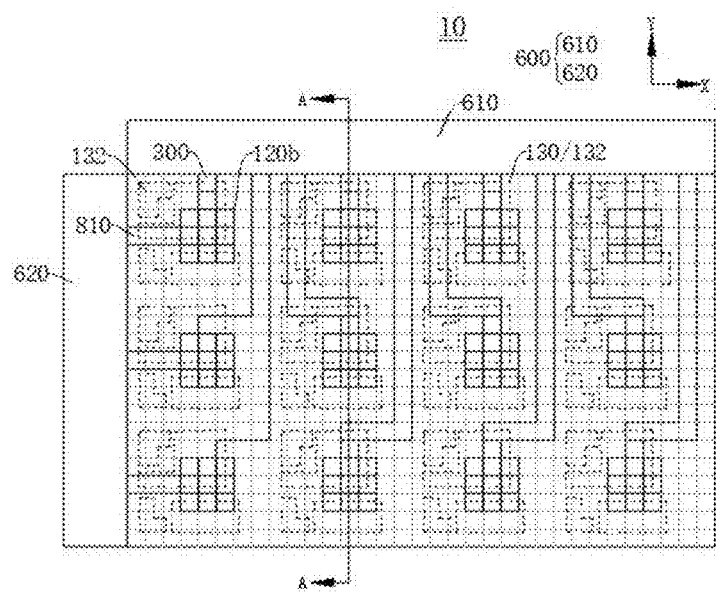
FIG. 12 shows a schematic structural diagram of a display panel assembly according to yet another embodiment of the first aspect of the present application.
Figure 13:
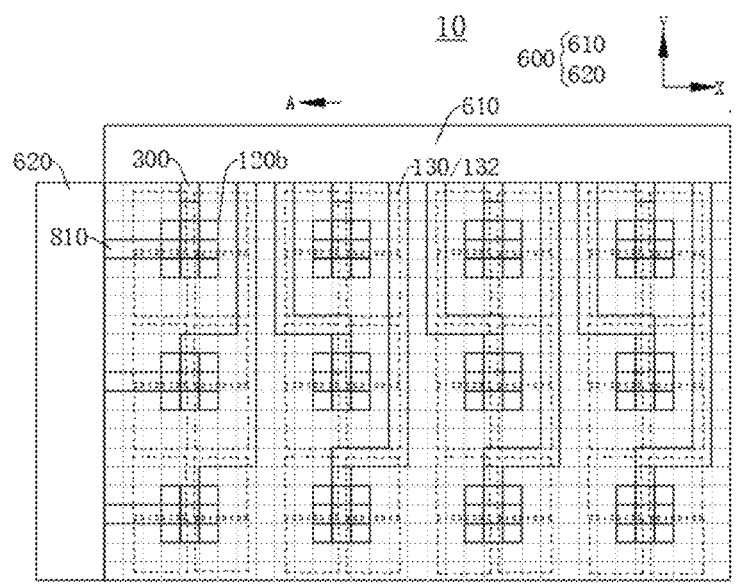
FIG. 13 shows a schematic structural diagram of a display panel assembly according to yet another embodiment of the first aspect of the present application.

If the second multi-function unit 120b and the metasurface assembly are arranged in different layers, as shown in FIG. 8, the second multi-function units 120b and the metasurface units 130 are arranged in one-to-one correspondence, that is, the orthographic projection of each second multi-function unit 120b on the base plate 11 at least partially overlaps the orthographic projection of each metasurface unit 130 on the base plate 11. Alternatively, as shown in FIGS. 12 and 13, a plurality of metasurface units 130 are arranged corresponding to the same second multi-function unit 120b. If a plurality of metasurface units 130 are arranged corresponding to the same second multi-function unit 120b, the orthographic projection of at least one of the plurality of metasurface units 130 on the base plate 11 at least partially overlaps the orthographic projection of the second multi-function unit 120b corresponding to the metasurface unit 130 on the base plate 11, so as to facilitate the metasurface unit 130 to increase the performance of the second multi-function unit 120b.

If the second multi-function unit 120b and the metasurface assembly are arranged in different layers, at least a portion of the metasurface units 130 are located at a side of the second multi-function units 120b facing the display surface of the display panel assembly 10, and/or at least a portion of the metasurface units 130 are located at a side of the second multi-function units 120b away from the display surface of the display panel assembly 10. That is, at least a portion of the metasurface units 130 are located at a side of the second multi-function units 120b away from the base plate 11, and/or at least a portion of the metasurface units 130 are located at a side of the second multi-function units 120b facing the base plate 11.

Figure 14:
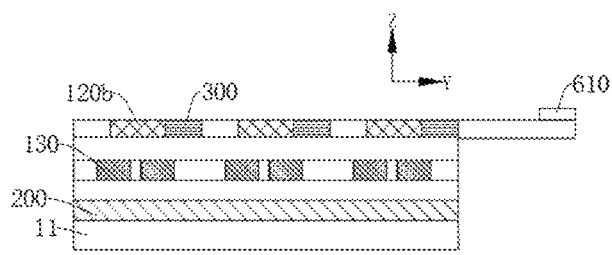
FIG. 14 shows a sectional view at A-A in FIG. 4 in yet another example.

For example, a plurality of metasurface units 130 are arranged in a same layer, and these metasurface units 130 may be located at a side of the second multi-function units 120b facing the display surface of the display panel assembly 10. Alternatively, as shown in FIG. 14, these metasurface units 130 may be located at a side of the second multi-function units 120b away from the display surface of the display panel assembly 10.

Alternatively, a plurality of metasurface units 130 are arranged in different layers, a portion of the plurality of metasurface units 130 are located at a side of the second multi-function units 120b facing the display surface of the display panel assembly 10, and another portion of the plurality of metasurface units 130 are located at a side of the second multi-function units 120b away from the display surface of the display panel assembly 10.

Optionally, the antenna unit 901 may be connected with one radio frequency line 810, or a same antenna unit 901 is connected with two or more radio frequency lines 810, so that the same antenna unit 901 can be connected to two or more radio frequency circuits 620 through two or more radio frequency lines 810.

Optionally, a same reflecting unit 110 may be connected with one control line 300, or a same reflecting unit 110 is connected with two or more control lines 300, so that the same reflecting unit 110 can be connected to two or more control circuits 610 through two or more control lines 300.

Figure 15:
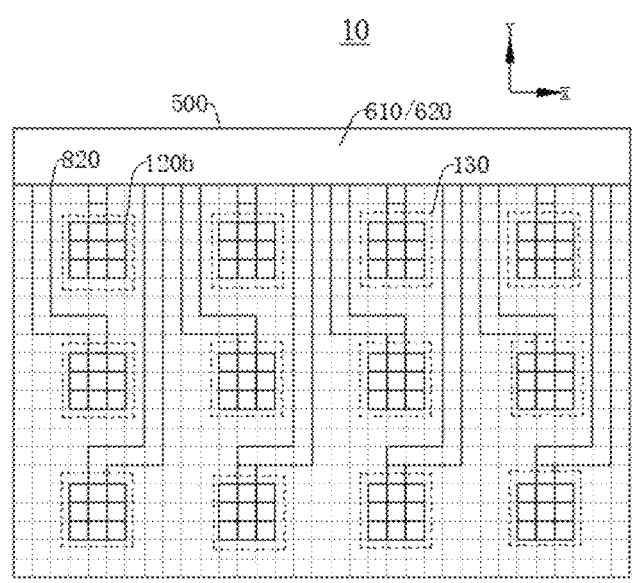
FIG. 15 shows a schematic structural diagram of a display panel assembly according to yet another embodiment of the first aspect of the present application.
Figure 16:
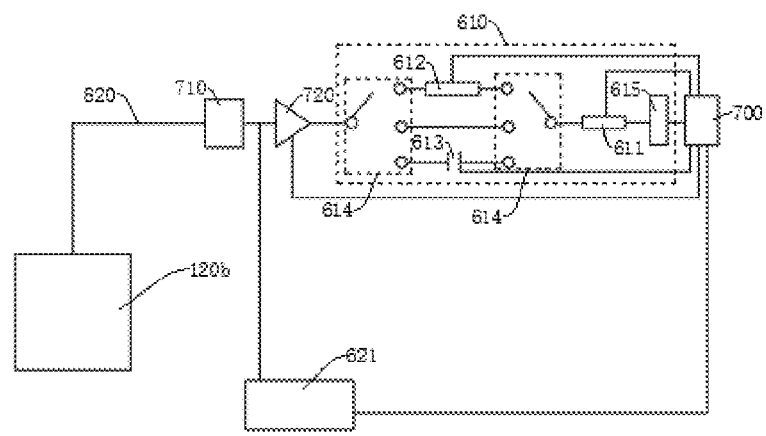
FIG. 16 shows a schematic structural diagram of a circuit of a display panel assembly according to another embodiment of the first aspect of the present application.

Optionally, if the reflecting unit 110 and the antenna assembly 900 are reused as the second multi-function unit 120b, as shown in FIGS. 15 and 16, the radio frequency line 810 and the control line 300 may be reused as a multi-function control feeder line 820, so that the second multi-function unit 120b can be connected to both the radio frequency circuit 620 and the control circuit 610 through the multi-function control feeder line 820.

Figure 17:
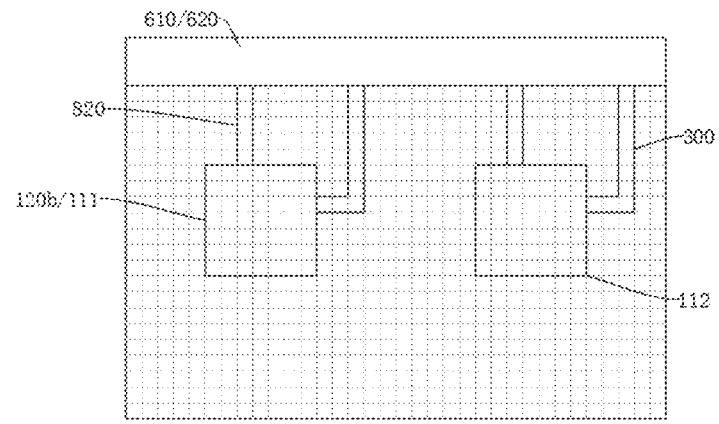
FIG. 17 shows a schematic structural diagram of a display panel assembly according to yet another embodiment of the first aspect of the present application.
Figure 18:
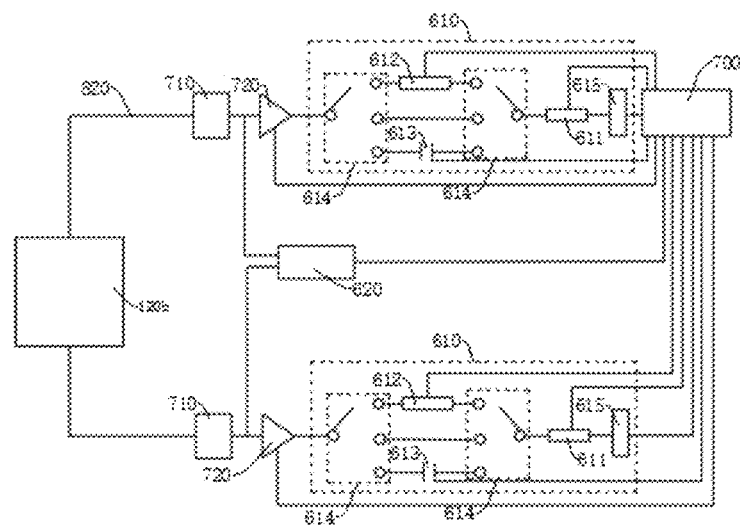
FIG. 18 shows a schematic structural diagram of a circuit of a display panel assembly according to yet another embodiment of the first aspect of the present application.

As shown in FIGS. 17 and 18, the number of the multi-function control feeder lines 820 connected with a same second multi-function unit 120b is two or more, and a same second multi-function unit 120b can be connected to two or more control circuits 610 and/or radio frequency circuits 620 through two or more multi-function control feeder lines 820.

Figure 19:
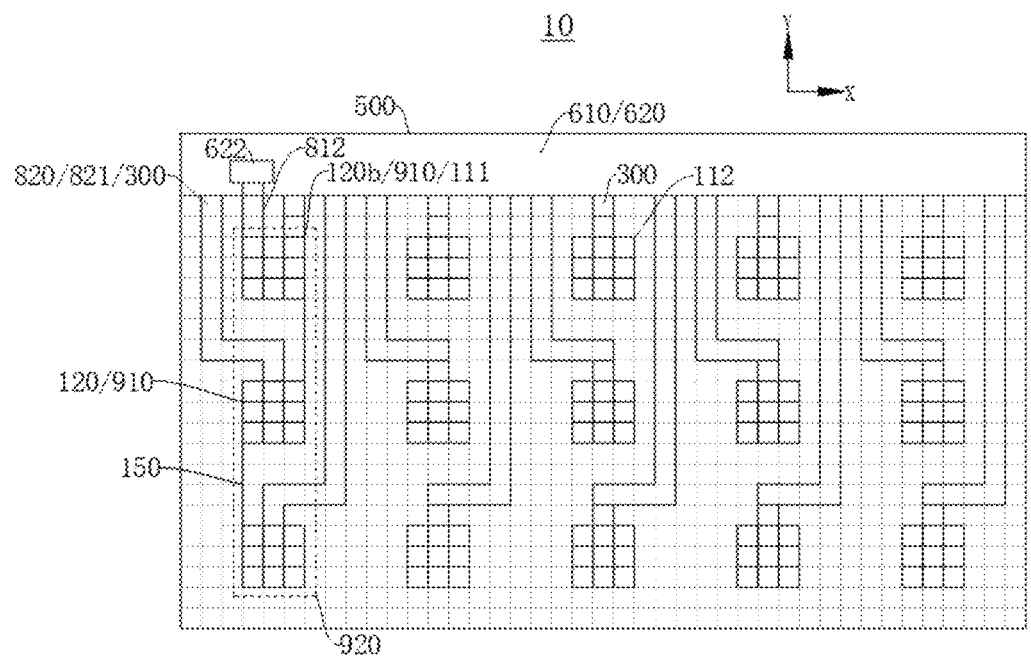
FIG. 19 shows a schematic structural diagram of a display panel assembly according to yet another embodiment of the first aspect of the present application.
Figure 20:
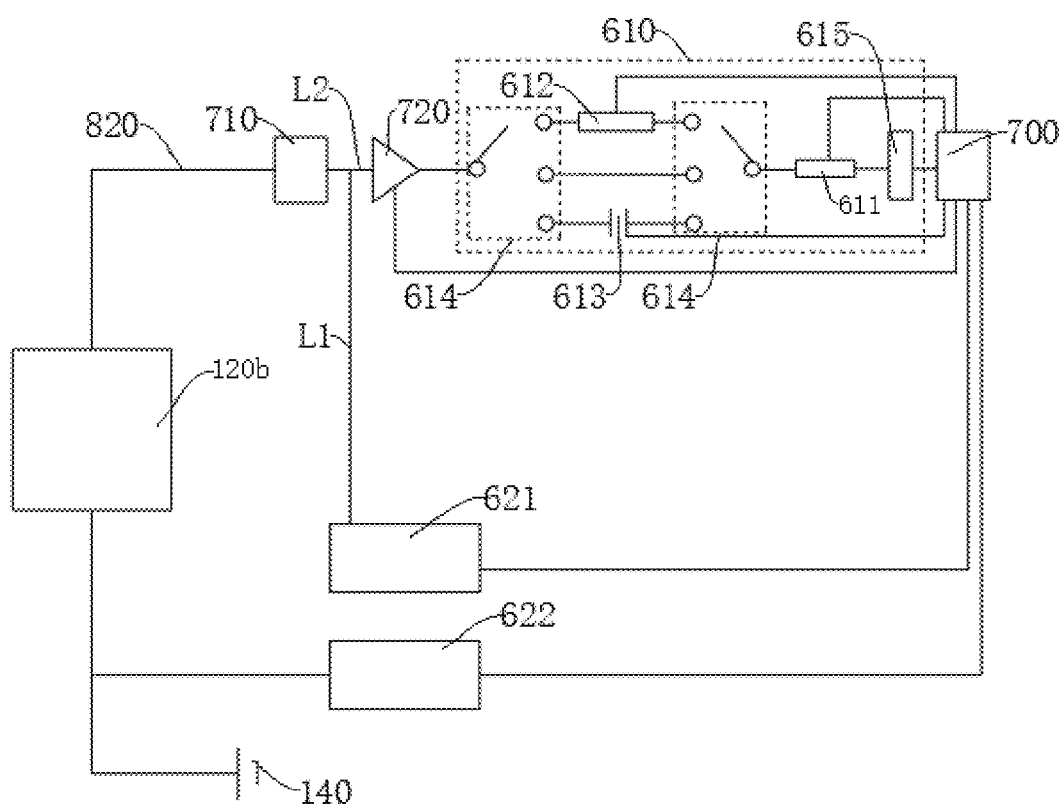
FIG. 20 shows a schematic structural diagram of a circuit of a display panel assembly according to yet another embodiment of the first aspect of the present application.

Optionally, as shown in FIGS. 19 and 20, the antenna unit 901 includes a millimeter wave antenna unit 910 and a non-millimeter wave antenna unit 920, and the second multi-function unit 120b may be reused as the millimeter wave antenna unit 910 and a portion of the non-millimeter wave antenna unit 920. The radio frequency circuit 620 includes a millimeter wave radio frequency circuit 621 and a non-millimeter wave radio frequency circuit 622.

Optionally, the second multi-function unit 120b is reused as the millimeter wave antenna unit 910 and can be further configured to receive and transmit millimeter wave antenna signals.

Optionally, the second multi-function unit 120b being reused as a portion of the non-millimeter wave antenna unit 920 may mean that: one second multi-function unit 120b is reused as a portion of the non-millimeter wave antenna unit 920; or at least two adjacent second multi-function units 120b are connected through a connecting signal line 150 and reused as a portion of the non-millimeter wave antenna unit 920; or at least two adjacent second multi-function units 120b are connected through a connecting signal line 150 and reused as the non-millimeter wave antenna unit 920. The second multi-function unit 120b being reused as a portion of the non-millimeter wave antenna unit 920 means that the second multi-function unit 120b may have the functionality of the non-millimeter wave antenna unit 920 and be configured to receive and transmit non-millimeter wave wireless signals.

Optionally, if at least two adjacent second multi-function units 120b are connected through a connecting signal line 150 and reused as a portion of the non-millimeter wave antenna unit 920, the at least two adjacent second multi-function units 120b are connected in series and/or in parallel with each other through the connecting signal line 150 and reused as a portion of the non-millimeter wave antenna unit 920.

Optionally, the second multi-function unit 120b reused as the millimeter wave antenna unit 910 and the second multi-function unit 120b reused as a portion of the non-millimeter wave antenna unit 920 may be the same second multi-function unit 120b or different second multi-function units 120b.

Optionally, the millimeter wave antenna unit 910 is a radiating portion of a millimeter wave antenna, or the millimeter wave antenna unit 910 includes a millimeter wave feeding portion and a millimeter wave radiating portion, and the second multi-function unit 120b may be reused as the millimeter wave radiating portion. Optionally, the non-millimeter wave antenna unit 920 is a radiating portion of a non-millimeter wave antenna, or the non-millimeter wave antenna unit 920 includes a non-millimeter wave feeding portion and a non-millimeter wave radiating portion, and the second multi-function unit 120b may be reused as a portion of the non-millimeter wave radiating portion.

For example, if the display panel assembly 10 is used in a wireless communication apparatus including a control circuit 610 and a radio frequency circuit 620, the second multi-function unit 120b and the control circuit 610 are electrically connected with each other, so that the control circuit 610 can control the second multi-function unit 120*b* to reflect wireless signals. The radio frequency circuit 620 includes a millimeter wave radio frequency circuit 621 and a non-millimeter wave radio frequency circuit 622, the millimeter wave radio frequency circuit 621 is connected to at least one second multi-function unit 120*b* so that the second multi-function unit 120*b* is reused as the millimeter wave antenna unit 910 and used to receive and transmit millimeter wave antenna signals, and the non-millimeter wave radio frequency circuit 622 is connected to at least one second multi-function unit 120*b* so that the second multi-function unit 120*b* is reused as a portion of the non-millimeter wave antenna unit 920 and used to receive and transmit non-millimeter wave antenna signals.

In some optional embodiments, a same second multi-function unit 120*b* is reused as the millimeter wave antenna unit 910 and a portion of the non-millimeter wave antenna unit 920, that is, the same second multi-function unit 120*b* can be used to receive and transmit both millimeter wave wireless signals and non-millimeter wave wireless signals, and thus the structure of the display panel assembly 10 can be further simplified.

In other embodiments, at least one of a plurality of second multi-function units 120*b* is reused as the millimeter wave antenna unit 910, and at least another one of the second multi-function units 120*b* is reused as a portion of the non-millimeter wave antenna unit 920. That is, the second multi-function unit 120*b* reused as the millimeter wave antenna unit 910 and the second multi-function unit 120*b* reused as a portion of the non-millimeter wave antenna unit 920 are different second multi-function units 120*b*, which can reduce signal crosstalk.

Figure 21:
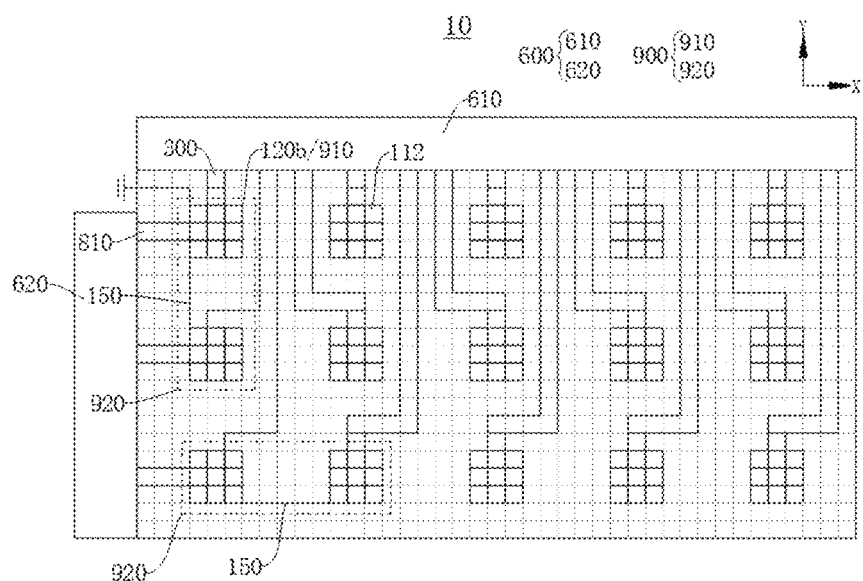
FIG. 21 shows a schematic structural diagram of a display panel assembly according to yet another embodiment of the first aspect of the present application.
Figure 22:
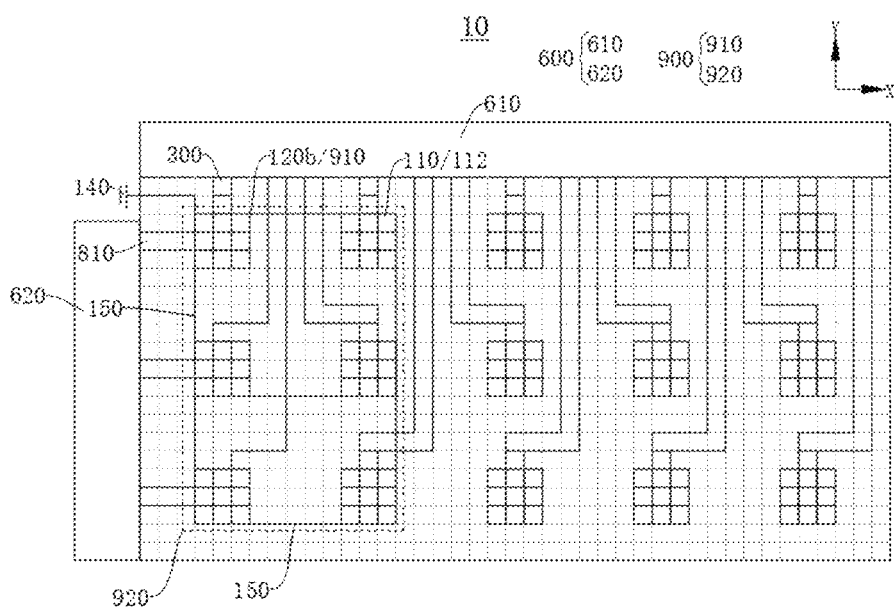
FIG. 22 shows a schematic structural diagram of a display panel assembly according to yet another embodiment of the first aspect of the present application.

Optionally, as shown in FIG. 21, the number of the non-millimeter wave antenna units 920 and/or the number of the millimeter wave antenna units 910 may be two or more, so as to improve the ability of the display panel assembly 10 to receive and transmit non-millimeter wave signals and/or millimeter wave signals. Alternatively, as shown in FIGS. 19 and 22, the number of the non-millimeter wave antenna units 920 may be one. FIG. 22 differs from FIG. 19 in that the non-millimeter wave antenna unit 920 include a different number of second multi-function units 120*b*.

Figure 23:
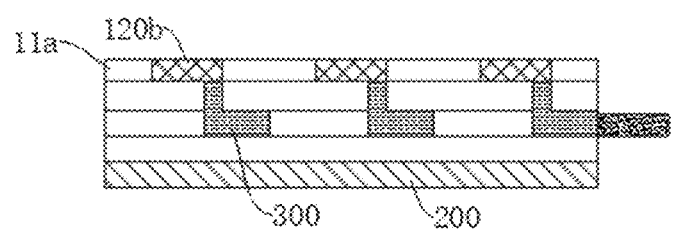
FIG. 23 shows a sectional view at A-A in FIG. 1 in another example.
Figure 24:
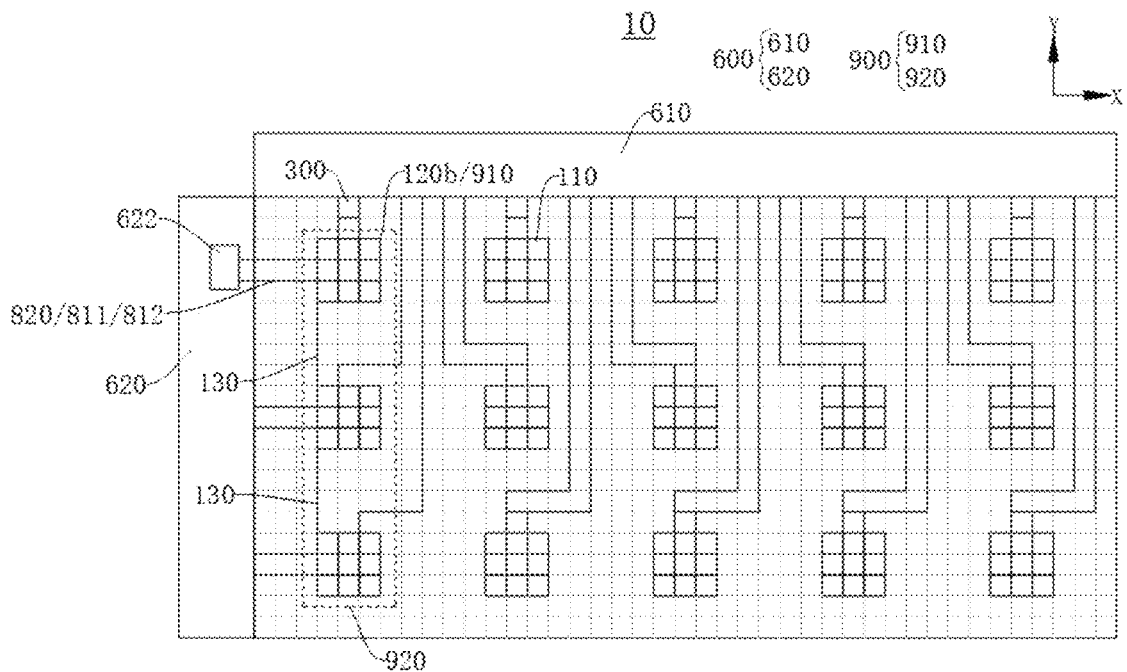
FIG. 24 shows a schematic structural diagram of a display panel assembly according to yet another embodiment of the first aspect of the present application.
Figure 25:
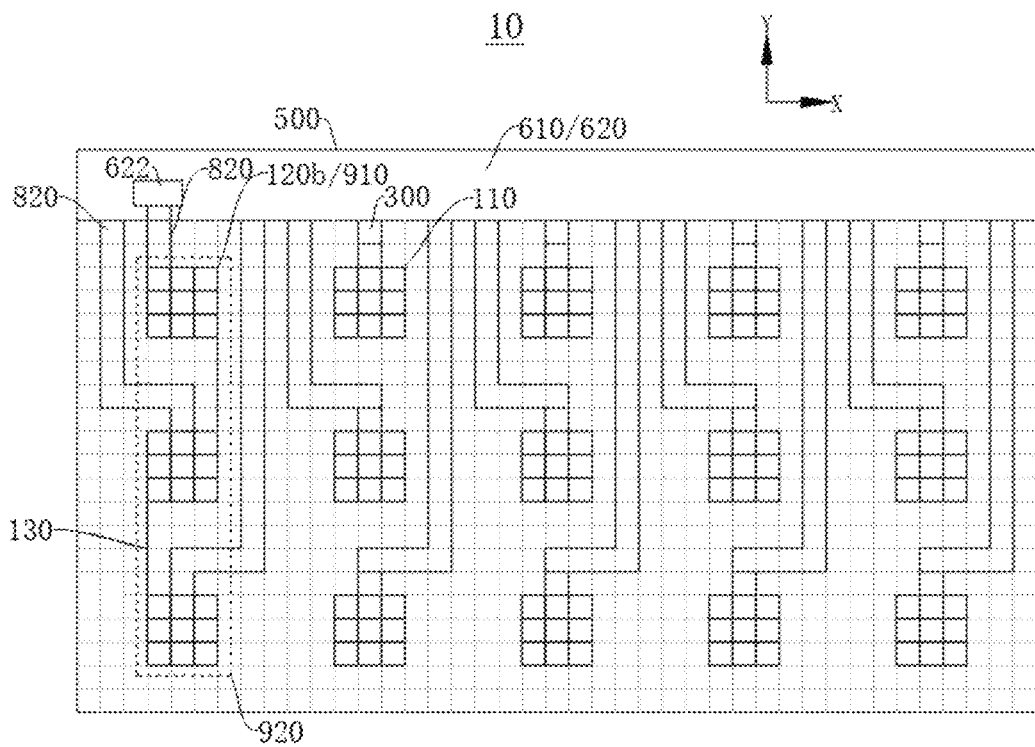
FIG. 25 shows a schematic structural diagram of a display panel assembly according to yet another embodiment of the first aspect of the present application.

Optionally, if the display panel assembly 10 includes a control line 300 and the second multi-function unit 120*b*, as shown in FIG. 2, the control line 300 and the second multi-function unit 120*b* may be arranged in a same layer. Alternatively, as shown in FIG. 23, the control line 300 and the second multi-function unit 120*b* may be arranged in different layers.

Optionally, a same second multi-function unit 120*b* is connected with the control circuit 610 as well as the millimeter wave radio frequency circuit 621 and the non-millimeter wave radio frequency circuit 622, so that the same second multi-function unit 120*b* can be reused as the reflecting unit 110, the millimeter wave antenna unit 910, and a portion of the non-millimeter wave antenna unit 920.

In some optional embodiments, as shown in FIGS. 19 and 20, as described above, the display panel assembly 10 further includes a multi-function control feeder line 820, in which one end of the multi-function control feeder line 820 is connected to the second multi-function unit 120*b*, and the other end of the multi-function control feeder line 820 is configured to be connected to the control circuit 610 and the radio frequency circuit 620, so as to enable the control circuit 610 and the radio frequency circuit 620 to transmit a control signal to the second multi-function unit 120*b* via the multi-function control feeder line 820.

If the second multi-function unit 120*b* is reused as the millimeter wave antenna unit 910, the other end of the multi-function control feeder line 820 is connected to the millimeter wave radio frequency circuit 621. If the second multi-function unit 120*b* is reused as the non-millimeter wave antenna unit 920, the other end of the multi-function control feeder line 820 is connected to the non-millimeter wave radio frequency circuit 622. If a same second multi-function unit 120*b* is reused the millimeter wave antenna unit 910 and a portion of the non-millimeter wave antenna unit 920, the other end of the multi-function control feeder line 820 is connected to the millimeter wave radio frequency circuit 621 and the non-millimeter wave radio frequency circuit 622.

Optionally, as shown in FIGS. 19 to 24, the display panel assembly 10 further includes a radio frequency line 810 for connecting the radio frequency circuit 620 to the second multi-function unit 120*b*. The radio frequency line 810 includes a millimeter wave feeder line 811 and a non-millimeter wave feeder line 812. The multi-function control feeder line 820 may be reused as at least two of the millimeter wave feeder line 811, the non-millimeter wave feeder line 812, and the control line 300.

Optionally, the multi-function control feeder line 820 is reused as the millimeter wave feeder line 811 and the control line 300, the display panel assembly 10 includes the non-millimeter wave feeder line 812 and the multi-function control feeder line 820, the non-millimeter wave feeder line 812 connects the non-millimeter wave radio frequency circuit 622 to the second multi-function unit 120*b*, and the multi-function control feeder line 820 connects the second multi-function unit 120*b* to the millimeter wave radio frequency circuit 621 and the control circuit 610. Alternatively, the multi-function control feeder line 820 is reused as the millimeter wave feeder line 811 and the non-millimeter wave feeder line 812, the display panel assembly 10 includes the control line 300 and the multi-function control feeder line 820, the control line 300 connects the control circuit 610 to the second multi-function unit 120*b*, and the multi-function control feeder line 820 connects the second multi-function unit 120*b* to the millimeter wave radio frequency circuit 621 and the non-millimeter wave radio frequency circuit 622. Alternatively, the multi-function control feeder line 820 is reused as the millimeter wave feeder line 811, the non-millimeter wave feeder line 812, and the control line 300. The multi-function control feeder line 820 connects the second multi-function unit 120*b* to the millimeter wave radio frequency circuit 621, the non-millimeter wave radio frequency circuit 622, and the control circuit 610.

In some optional embodiments, as shown in FIGS. 16 to 26, two or more second multi-function units 120*b* are connected to each other by the connecting signal line 150 and reused as the non-millimeter wave antenna unit 920, i.e., the non-millimeter wave antenna unit 920 is formed by reusing two or more second multi-function units 120*b*, which can further simplify the structure of the non-millimeter wave antenna unit 920.

Optionally, at least one of the two or more second multi-function units 120*b* reused as the non-millimeter wave antenna unit 920 is reused as the millimeter wave antenna unit 910, so as to further simplify the structure of the display panel assembly 10.

In any of the above embodiments, the connecting signal line 150 may be set in various ways. For example, the connecting signal line 150 may include a single wire or a plurality of wires arranged side-by-side, or the connecting signal line 150 may include a plurality of wires arranged side-by-side and a bridge wire for connecting the wires arranged side-by-side.

If the second multi-function units 120b that are connected to each other and reused as the non-millimeter wave antenna unit 920 are further reused as the millimeter wave antenna unit 910, at least a portion of the connecting signal line 150 has a line width that is not greater than the width of the millimeter wave antenna unit 910. Optionally, the millimeter wave antenna unit 910 includes a millimeter wave wire, and at least a portion of the connecting signal line 150 has a line width that is not greater than the width of the millimeter wave wire in the millimeter wave antenna unit 910.

If the millimeter wave antenna unit 910 is block-shaped, the millimeter wave antenna unit 910 may be understood to include one millimeter wave wire; and if the millimeter wave antenna unit 910 includes a plurality of millimeter wave wires, at least a portion of the connecting signal line 150 having a line width that is less than the width of the millimeter wave antenna unit 910 means that: the line width of at least a portion of the connecting signal line 150 is less than the sum of the widths of the plurality of millimeter wave wires in the millimeter wave antenna unit 910.

In the embodiments of the present application, if at least a portion of the connecting signal line 150 has a line width that is not greater than the width of the millimeter wave wire in the millimeter wave antenna unit 910, the connecting signal line 150 is narrower and thus has a higher impedance, so that the connecting signal line 150 can better filter and block the currents in millimeter wave band. Nonetheless, the connecting signal line 150 may transit all non-millimeter wave currents. Therefore, in the embodiments of the present application, the non-millimeter wave currents can better pass through the connecting signal line 150, while the millimeter wave currents are blocked by the connecting signal line 150.

The millimeter wave current refers to a current corresponding to the millimeter wave band wireless signal transmitted and received by the millimeter wave antenna unit 910, and the non-millimeter wave current refers to a current corresponding to the non-millimeter wave band wireless signal transmitted and received by the non-millimeter wave antenna unit 920.

Optionally, if at least a portion of the connecting signal line 150 has a line width that is not greater than the width of the millimeter wave antenna unit 910, as shown in FIG. 19, and if the connecting signal line 150 includes a single wire, the line width of the single wire in the connecting signal line 150 is not greater than the sum of the line widths of the millimeter wave wires in the millimeter wave antenna unit 910 extending in the same direction as the connecting signal line 150. In other embodiments, if the connecting signal line 150 includes a plurality of wires, the sum of the line widths of the plurality of wires in the connecting signal line 150 is not greater than the sum of the line widths of the millimeter wave wires in the millimeter wave antenna unit 910 extending in the same direction as the connecting signal line 150. As shown in FIG. 19, if the first direction X is perpendicular to the second direction Y and the connecting signal line 150 extends along the second direction Y, the line width direction of the connecting signal line 150 is the first direction X, and the width direction of the millimeter wave wire is also the first direction X.

In the embodiment of the present application, if the sum of the line widths of the wires in the connecting signal line 150 is not greater than the sum of the line widths of the millimeter wave wires in the millimeter wave antenna unit 910 extending in the same direction as the connecting signal line 150, the connecting signal line 150 is narrower and thus has a higher impedance, so that the connecting signal line 150 can better filter and block the currents in millimeter wave band.

The connecting signal line 150 may be set in various ways. For example, the connecting signal line 150 may be a straight line, i.e., the connecting signal line 150 extends in a same direction. Alternatively, the connecting signal line 150 may be a bent line, i.e., the connecting signal line 150 extends along a bent path. Alternatively, the connecting signal line 150 may be an arc line. Alternatively, the connecting signal line 150 is formed by a combination of at least two of the straight line, the folded line, and the arc line.

Figure 26:
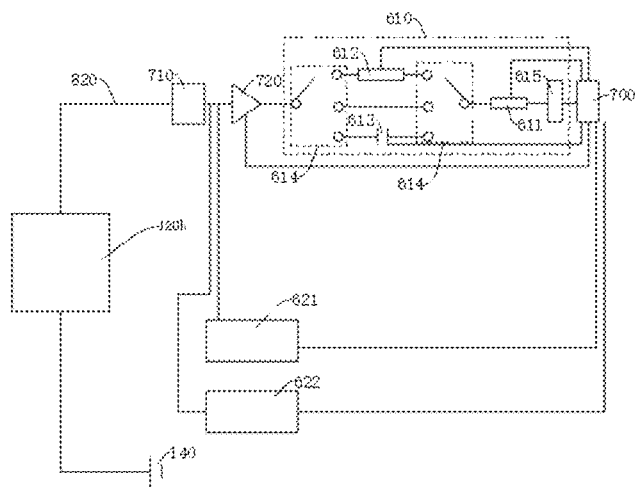
FIG. 26 shows a schematic structural diagram of a circuit of a display panel assembly according to yet another embodiment of the first aspect of the present application.

In some optional embodiments, as shown in FIGS. 20 and 26, at least one non-millimeter wave antenna unit 920 is connected to a first signal voltage 140, which may be a negative voltage signal or a ground voltage signal.

Optionally, the non-millimeter wave antenna unit 920 may be connected to the first signal voltage 140 through a reused second multi-function units 120b, i.e., at least one second multi-function unit 120b reused as the non-millimeter wave antenna unit 920 is connected to the first signal voltage 140, or the non-millimeter wave antenna unit 920 may be connected to the first signal voltage 140 through the connecting signal line 150.

Optionally, if the number of the non-millimeter wave antenna units 920 is two or more, it is sufficient that at least one of the non-millimeter wave antenna units 920 is connected to the first signal voltage 140.

Optionally, in any of the above embodiments, the millimeter wave antenna unit 910 is used to transmit/receive millimeter wave band wireless signals, i.e., to transmit and/or receive millimeter wave band wireless signals. Similarly, the non-millimeter wave antenna unit 920 is used to transmit/receive non-millimeter wave band wireless signals, i.e., to transmit and/or receive non-millimeter wave band wireless signals.

Two or more millimeter wave antenna units 910 are distributed at intervals around the periphery of the display panel assembly 10, and the millimeter wave antenna units 910 are located at different locations on the display panel assembly 10. When a user operates the display panel assembly 10 using different gestures, one or more millimeter wave antenna units 910 are not blocked by the user, so that the stability of the millimeter wave antenna units 910 for receiving and transmitting wireless signals can be increased, and the wireless experience of the user can be improved.

Optionally, the non-millimeter wave antenna units 920 are distributed at intervals around the periphery of the display panel assembly 10, and the non-millimeter wave antenna units 920 are located at different locations on the display panel assembly 10. When a user operates the display panel assembly 10 using different gestures, one or more non-millimeter wave antenna units 920 are not blocked by the user, so that the stability of the non-millimeter wave antenna units 920 for receiving and transmitting wireless signals can be increased, and the wireless experience of the user can be improved.

Optionally, each of the second multi-function units 120b is connected to at least one control circuit 610, and different second multi-function units 120b are connected to different control circuits 610, so that the second multi-function units 120b are separately controlled through the control circuits 610. Optionally, each of the second multi-function units 120b is connected to at least one radio frequency circuit 620, and for example, each of the second multi-function units 120b is connected to at least one millimeter wave radio frequency circuit 621 and at least one non-millimeter wave radio frequency circuit 622, and different second multi-function units 120b are connected to different radio frequency circuits 620, so that the second multi-function units 120b are separately controlled through the radio frequency circuits 620.

Optionally, the orthographic projection of two or more second multi-function units 120b on the base plate 11 is located within the orthographic projection of the conductive layer 200 on the base plate 11.

Optionally, at least one of the reflecting units 110 are reused as one of the metasurface unit 130 and the antenna unit 901 to form a multi-function unit 120, the display panel assembly 10 further includes a functional layer 100, and the multi-function unit 120 is arranged in the functional layer 100. That is, the first multi-function unit 120a and the second multi-function unit 120b may be collectively referred to as the multi-function unit 120, which is located in the functional layer 100.

Figure 27:
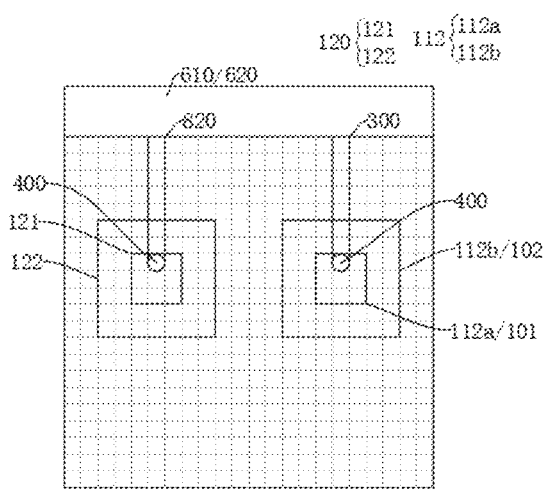
FIG. 27 shows a schematic structural diagram of a display panel assembly according to yet another embodiment of the first aspect of the present application.

In some optional embodiments, as shown in FIG. 27, the number of the functional layers 100 is two or more, and the orthographic projections of at least two multi-function units 120 located in different functional layers 100 on the base plate 11 are of different areas.

In these optional embodiments, by arranging two or more functional layers 100 and arranging multi-function units 120 of different sizes in different functional layers 100, the multi-function units 120 can reflect wireless signals in different frequency bands or receive and transmit antenna signals in different frequency bands, and thus the wireless communication performance of the display panel assembly 10 can be further improved. The multi-function unit 120 maybe the first multi-function unit 120a and/or the second multi-function unit 120b.

In some optional embodiments, a portion of the plurality of reflecting units 110 are reused as the antenna unit 901, i.e., a portion of the plurality of reflecting units 110 and the antenna unit 901 are reused as the second multi-function unit 120b, and another portion of the plurality of reflecting units 110 may be reused as the metasurface, or another portion of the plurality of reflecting units 110 are used only as the reflecting unit 110. For example, the plurality of reflecting units 110 include a first reflecting unit 111 and a second reflecting unit 112, the first reflecting unit 111 and the antenna unit 901 are reused as the second multi-function unit 120b, the second reflecting unit 112 is used only as the reflecting unit 110, while the second reflecting unit 112 is not reused as the antenna unit 901 or the metasurface unit 130.

Optionally, the first reflecting unit 111 and the antenna unit 901 are reused as the second multi-function unit 120b, and both the second reflecting unit 112 and the second multi-function unit 120b are connected to the control circuit 610, which is configured to control the second reflecting unit 112 and the second multi-function unit 120b to reflect wireless signals. Optionally, each second reflecting unit 112 and each second multi-function unit 120b are connected to different control circuits 610. Optionally, two or more second multi-function units 120b are arranged in an array within a same functional layer 100.

Optionally, the orthographic projection of the second reflecting unit 112 on the base plate 11 is located within the orthographic projection of the conductive layer 200 on the base plate 11, so that the conductive layer 200 can further block the wireless signals that are not reflected by the second reflecting unit 112.

In some optional embodiments, the first reflecting unit 111 and the antenna unit 901 are reused as the second multi-function unit 120b, a plurality of second reflecting units 112 are combined to form a reflecting group, and the second multi-function unit 120b is located at at least one side of the periphery of the reflecting group. That is, the second multi-function unit 120b reused as the antenna unit 901 and the reflecting unit 110 is arranged at the periphery the reflecting group which is separately used for reflecting wireless signals, and the second multi-function unit 120b is arranged closer to the edge of the wireless communication apparatus, so as to reduce the effect of the second multi-function unit 120b on the display of the wireless communication apparatus.

Optionally, at least a portion of the second multi-function units 120b are arranged in the same layer as the second reflecting unit 112, and for example, all of the second multi-function units 120b are arranged in the same layer as the second reflecting unit 112, so that the second multi-function units 120b and the reflecting reflective unit 112 can be manufactured in a same process step, which can simplify the manufacturing process the wireless communication apparatus. Optionally, for the second multi-function unit 120b and the second reflecting unit 112 arranged in the same layer, the orthographic projection of the second multi-function unit 120b on the base plate 11 and the orthographic projection of the second reflecting unit 112 on the base plate 11 are of the same size and shape, so as to simplify the shape arrangement of the second multi-function unit 120b and the second reflecting unit 112 arranged in the same layer.

Optionally, the multi-function control feeder line 820 and the second multi-function unit 120b may be arranged in a same layer, so as to reduce the number of layer structures of the display panel assembly 10.

Alternatively, the multi-function control feeder line 820 and the second multi-function unit 120b may be arranged in different layers, so that the arrangement of the second multi-function unit 120b and the arrangement of the multi-function control feeder line 820 do not affect each other.

In some optional embodiments, the display panel assembly 10 further includes a control line 300 for connecting the second reflecting unit 112 to the control circuit 610, i.e., the control line 300 is also used to connect the second reflecting unit 112 to the control circuit 610. The control line 300 and the multi-function control feeder line 820 are arranged in a same layer, so that the control line 300 and the multi-function control feeder line 820 can be manufactured in a same process step, which can simplify the manufacturing process of the display panel assembly 10. In some other embodiments, the control line 300 and the multi-function control feeder line 820 may be arranged in different layers, so as to enable the control line 300 and the multi-function control feeder line 820 to be arranged more flexibly.

Optionally, as described above, the display panel assembly 10 further includes the radio frequency line 810, and the second multi-function unit 120b connected with the radio frequency line 810 and the second multi-function unit 120b connected with the multi-function control feeder line 820 may be the same or different. In order to simplify the structure of the display panel assembly 10, the second multi-function units 120b connected with the radio frequency line 810 and the multi-function control feeder line 820 may be different. Optionally, the second multi-function unit 120b connected with the radio frequency line 810 is further connected with the control line 300. That is, for a plurality of second multi-function units 120b, a portion of the second multi-function units 120b can be connected to the radio frequency circuit 620 and the control circuit 610 through the multi-function control feeder line 820, and another portion of the second multi-function units 120b can be connected to the radio frequency circuit 620 through the radio frequency line 810 and to the control circuit 610 through the control line 300.

Optionally, at least two of the radio frequency line 810, the control line 300, and the multi-function control feeder line 820 are arranged in a same layer, so as to simplify the manufacturing process of the display panel assembly 10.

Optionally, the reflecting unit 110, the antenna unit 901, and the metasurface unit 130 are all arranged in the functional layer 100.

Optionally, the second reflecting units 112 are also arranged in the functional layers 100, the second reflecting unit 112 is arranged in each of the two or more functional layers 100, and the orthographic projections of at least two second reflecting units 112 located in different functional layers 100 are of different areas. The second reflecting units 112 of different sizes can reflect wireless signals in different frequency bands, and thus the wireless communication performance of the wireless communication apparatus is further improved.

Optionally, the orthographic projections of two or more multi-function units 120 within a same functional layer 100 on the base plate 11 are of a same area, i.e., the two or more multi-function units 120 within the same functional layer 100 are of a same size, so that the two or more multi-function units 120 within the same functional layer 100 can reflect wireless signals in a same frequency band, and thus the ability of reflecting wireless signals of a same frequency is improved.

Optionally, the orthographic projections of two or more second reflecting units 112 within a same functional layer 100 on the base plate 11 are of a same area, i.e., the two or more second reflecting units 112 within the same functional layer 100 are of a same size, so that the two or more second reflecting units 112 within the same functional layer 100 can reflect wireless signals in a same frequency band, and thus the ability of reflecting wireless signals in a same frequency band is improved.

Optionally, for the second reflecting unit 112 and the multi-function unit 120 within a same functional layer 100, the area of the orthographic projection of the second reflecting unit 112 on the base plate 11 is the same as the area of the orthographic projection of the multi-function unit 120 on the base plate 11, so as to simplify the structure of the wireless communication apparatus. In addition, the ability of reflecting wireless signals in a same frequency band can also be improved.

In some optional embodiments, if the number of the functional layers 100 is two or more, the two or more functional layers 100 include a first functional layer 101 and a second functional layer 102, i.e., one of the two or more functional layers 100 is the first functional layer 101 and another is the second functional layer 102. The multi-function units 120 include one or more first sub-multi-function units 121 located in the first functional layer 101 and one or more second sub-multi-function units 121 located in the second functional layer 102, in which the first functional layer 101 is located at a side of the second functional layer 102 facing the display surface of the display panel assembly 10, and the area of the orthographic projection of the first sub-multi-function unit 121 on the base plate 11 is less than the area of the orthographic projection of the second sub-multi-function unit 122 on the base plate 11.

Optionally, the multi-function unit 120 may be the first multi-function unit 120a and/or the second multi-function unit 120b, and thus the first multi-function unit 120a may include the first sub-multi-function unit 121 and the second sub-multi-function unit 122, and/or the second multi-function unit 120b may include the first sub-multi-function unit 121 and the second sub-multi-function unit 122.

In these optional embodiments, the first sub-multi-function units 121 are located at a side of the second sub-multi-function units 122 facing the display surface of the display panel assembly 10, and the size of the first sub-multi-function unit 121 is less than the size of the second sub-multi-function unit 122. On the one hand, at least a portion of the second sub-multi-function units 122 are not blocked by the first sub-multi-function units 121, and the second sub-multi-function units 122 can also reflect wireless signals; on the other hand, the size of the first sub-multi-function unit 121 and the size of the second sub-multi-function unit 122 are different, therefore wireless signals in a plurality of frequency bands can be reflected, so that the display panel assembly 10 can regulate reflected signals for wireless signals in different frequency bands.

Optionally, the second reflecting units 112 include one or more first sub-reflecting units 112a located in the first functional layer 101 and one or more second sub-reflecting units 112b located in the second functional layer 102, and the area of the orthographic projection of the first sub-reflecting unit 112a on the base plate 11 is less than the area of the orthographic projection of the second sub-reflecting unit 112b on the base plate 11. On the one hand, at least a portion of the second sub-reflecting units 112b are not blocked by the first sub-reflecting units 112a, and the second sub-reflecting units 112b can also reflect wireless signals; on the other hand, the size of the first sub-reflecting unit 112a and the size of the second sub-reflecting unit 112b are different, therefore wireless signals in a plurality of frequency bands can be reflected, so that the display panel assembly 10 can regulate reflected signals for wireless signals in different frequency bands.

Optionally, the orthographic projection of the first sub-multi-function unit 121 on the base plate 11 at least partially overlaps the orthographic projection of the second sub-multi-function unit 122 on the base plate 11, so as to reduce the overall distribution area of two or more multi-function units 120. The orthographic projection of the first sub-multi-function unit 121 on the base plate 11 at least partially overlapping the orthographic projection of the second sub-multi-function unit 122 on the base plate 11 includes: the first sub-multi-function units 121 and the second sub-multi-function units 122 are arranged in one-to-one correspondence, and the orthographic projection of the first sub-multi-function unit 121 on the base plate 11 at least partially overlaps the orthographic projection of the second sub-multi-function unit 122 on the base plate 11. Alternatively, two or more first sub-multi-function units 121 are arranged corresponding to a same second sub-multi-function unit 122, or a same first sub-multi-function unit 121 is arranged corresponding to two or more second sub-multi-function units 122, as long as the orthographic projection of each first sub-multi-function unit 121 on the base plate 11 can at least partially overlap the orthographic projection of at least one second sub-multi-function unit 122 on the base plate 11, and the orthographic projection of each second sub-multi-function unit 122 on the base plate 11 can at least partially overlap the orthographic projection of at least one first sub-multi-function unit 121 on the base plate 11.

Optionally, the orthographic projection of the first sub-reflecting unit 112a on the base plate 11 at least partially overlaps the orthographic projection of the second sub-reflecting unit 112b on the base plate 11, so as to reduce the overall distribution area of two or more second reflecting units 112. The orthographic projection of the first sub-reflecting unit 112a on the base plate 11 at least partially overlapping the orthographic projection of the second sub-reflecting unit 112b on the base plate 11 includes: the first sub-reflecting units 112a and the second sub-reflecting units 112b are arranged in one-to-one correspondence, and the orthographic projection of the first sub-reflecting unit 112a on the base plate 11 at least partially overlaps the orthographic projection of the second sub-reflecting unit 112b on the base plate 11. Alternatively, two or more first sub-reflecting units 112a are arranged corresponding to a same second sub-reflecting unit 112b, or a same first sub-reflecting unit 112a is arranged corresponding to two or more second sub-reflecting units 112b, as long as the orthographic projection of each first sub-reflecting unit 112a on the base plate 11 can at least partially overlap the orthographic projection of at least one second sub-reflecting unit 112b on the base plate 11, and the orthographic projection of each second sub-reflecting unit 112b on the base plate 11 can at least partially overlap the orthographic projection of at least one first sub-reflecting unit 112a on the base plate 11.

Optionally, the size and shape of the first sub-reflecting unit 112a are the same as the shape and size of the first sub-multi-function unit 121, and the shape and size of the second sub-reflecting unit 112b are the same as the shape and size of the second sub-multi-function unit 122, so as to simplify the structure of the wireless communication apparatus.

Optionally, the number correspondence between the first sub-reflecting units 112a and the second sub-reflecting units 112b is the same as the number correspondence between the first sub-multi-function units 121 and the second sub-multi-function units 122. For example, if the first sub-reflecting units 112a and the second sub-reflecting units 112b are arranged in one-to-one correspondence, the first sub-multi-function units 121 and the second sub-multi-function units 122 are arranged in one-to-one correspondence.

Optionally, the wireless communication apparatus further includes a connecting portion 400 arranged in an overlapping area between the first sub-multi-function units 121 and the second sub-multi-function units 122 and connected to the first sub-multi-function units 121 and the second sub-multi-function units 122. Optionally, the connecting portion 400 is reused as a portion of at least one of the multi-function control feeder line 820, the control line 300, and the radio frequency line 810.

In these optional embodiments, the connecting portion 400 is arranged in an overlapping area between the first sub-multi-function units 121 and the second sub-multi-function units 122, so that the connecting portion 400 can be connected to both the first sub-multi-function units 121 and the second sub-multi-function units 122 by extending along the thickness direction of the display panel assembly 10, which can simplify the structure of the connection portion 400.

Optionally, the connecting portion 400 is further arranged in an overlapping area between the first sub-reflecting units 112a and the second sub-reflecting units 112b, and the connecting portion 400 is connected to the first sub-reflecting units 112a and the second sub-reflecting units 112b, so that the connecting portion 400 can be connected to both the first sub-reflecting units 112a and the second sub-reflecting units 112b by extending along the thickness direction of the display panel assembly 10, which can simplify the structure of the connection portion 400.

Optionally, the shape of the orthographic projection of the first sub-reflecting unit 112a on the base plate 11 and the shape of the orthographic projection of the second sub-reflecting unit 112b on the base plate 11 may be the same or different. For example, the orthographic projection of the second sub-reflecting unit 112b on the base plate 11 is rectangular, and the orthographic projection of the first sub-reflecting unit 112a on the base plate 11 may be rectangular, circular or the like.

Optionally, the first sub-multi-function units 121 and the second sub-multi-function units 122 may be arranged in one-to-one correspondence. Alternatively, since the size of the first sub-multi-function unit 121 is less than the size of the second sub-multi-function unit 122, two or more first sub-multi-function units 121 are arranged corresponding to a same second sub-multi-function unit 122.

Figure 28:
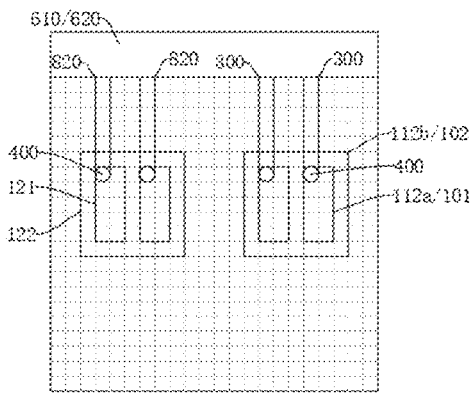
FIG. 28 shows a schematic structural diagram of a display panel assembly according to yet another embodiment of the first aspect of the present application.

In some optional embodiments, as shown in FIG. 28, two or more first sub-multi-function units 121 are arranged corresponding to a same second sub-multi-function unit 122, and for the second sub-multi-function unit 122 and the two or more first sub-multi-function units 121 corresponding to the second sub-multi-function unit 122, the orthographic projections of the two or more first sub-multi-function units 121 on the base plate 11 are located within the orthographic projection of the same second sub-multi-function unit 122 on the base plate 11.

In these optional embodiments, since the size of the first sub-multi-function unit 121 is small, two or more first sub-multi-function units 121 are arranged corresponding to a same second sub-multi-function unit 122, which can increase the number of the arranged first sub-multi-function units 121 and improve the wireless communication performance of the first functional layer 101. The orthographic projections of the two or more first sub-multi-function units 121 on the base plate 11 are located within the orthographic projection of the same second sub-multi-function unit 122 on the base plate 11, so that the arrangement of the first sub-multi-function units 121 and the second sub-multi-function units 122 is more regular, which facilitates the manufacturing.

Optionally, the first sub-reflecting units 112a and the second sub-reflecting units 112b may be arranged in one-to-one correspondence. Alternatively, since the size of the first sub-reflecting unit 112a is less than the size of the second sub-reflecting unit 112b, two or more first sub-reflecting units 112a are arranged corresponding to a same second sub-reflecting unit 112b.

In some optional embodiments, as shown in FIG. 28, two or more first sub-reflecting units 112a are arranged corresponding to a same second sub-reflecting unit 112b, and for the second sub-reflecting unit 112b and the two or more first sub-reflecting units 112a corresponding to the second sub-reflecting unit 112b, the orthographic projections of the two or more first sub-reflecting units 112a on the base plate 11 are located within the orthographic projection of the same second sub-reflecting unit 112b on the base plate 11.

In these optional embodiments, since the size of the first sub-reflecting unit 112a is small, two or more first sub-reflecting units 112a are arranged corresponding to a same second sub-reflecting unit 112b, which can increase the number of the arranged first sub-reflecting units 112a and improve the wireless communication performance of the first functional layer 101. The orthographic projections of the two or more first sub-reflecting units 112a on the base plate 11 are located within the orthographic projection of the same second sub-reflecting unit 112b on the base plate 11, so that the arrangement of the first sub-reflecting units 112a and the second sub-reflecting units 112b is more regular, which facilitates the manufacturing.

Figure 29:
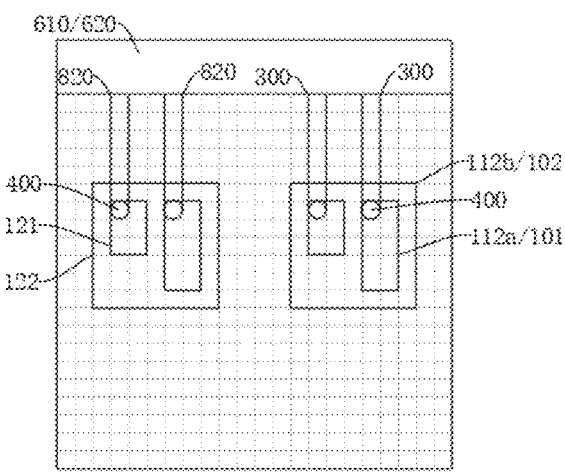
FIG. 29 shows a schematic structural diagram of a display panel assembly according to yet another embodiment of the first aspect of the present application.

Optionally, as shown in FIG. 29, for the second sub-multi-function unit 122 and the two or more first sub-multi-function units 121 corresponding to the second sub-multi-function unit 122, the orthographic projections of the two or more first sub-multi-function units 121 on the base plate 11 are of different areas, so that the two or more first sub-multi-function units 121 corresponding to the same second sub-multi-function unit 122 can reflect wireless signals in different frequency bands or receive and transmit antenna signals in different frequency bands, so as to further improve the wireless communication performance of the display panel assembly 10.

Optionally, for the second sub-reflecting unit 112b and the two or more first sub-reflecting units 112a corresponding to the second sub-reflecting unit 112b, the orthographic projections of the two or more first sub-reflecting units 112a on the base plate 11 are of different areas, so that the two or more first sub-reflecting units 112a corresponding to the same second reflecting unit 112b can reflect wireless signals in different frequency bands, so as to further improve the wireless communication performance of the display panel assembly 10.

In some other optional embodiments, as shown in FIG. 28, for the second sub-multi-function unit 122 and the two or more first sub-multi-function units 121 corresponding to the second sub-multi-function unit 122, the orthographic projections of the two or more first sub-multi-function units 121 on the base plate 11 may be of a same area. In some other optional embodiments, for the second sub-reflecting unit 112b and the two or more first sub-reflecting units 112a corresponding to the second sub-reflecting unit 112b, the orthographic projections of the two or more first sub-reflecting units 112a on the base plate 11 may be of a same area.

Figure 30:
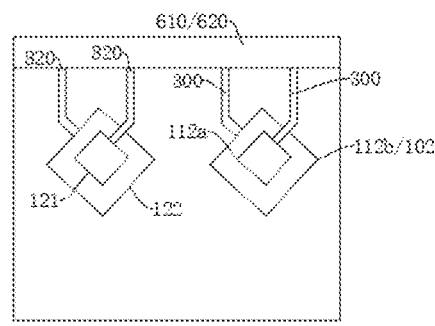
FIG. 30 shows a schematic structural diagram of a display panel assembly according to yet another embodiment of the first aspect of the present application.
Figure 31:
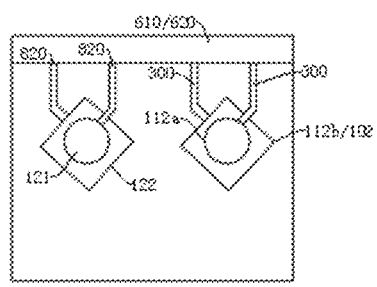
FIG. 31 shows a schematic structural diagram of a display panel assembly according to yet another embodiment of the first aspect of the present application.

Optionally, as shown in FIGS. 30 and 31, the shape of the orthographic projection of the first sub-multi-function unit 121 on the base plate 11 and the shape of the orthographic projection of the second sub-multi-function unit 122 on the base plate 11 may be the same or different. For example, the orthographic projection of the second sub-multi-function unit 122 on the base plate 11 is rectangular, and the orthographic projection of the first sub-multi-function unit 121 on the base plate 11 may be rectangular, circular or the like.

FIGS. 27 to 31 illustrate only one second sub-multi-function unit 122, but in other embodiments, the number of the second sub-multi-function units 122 may be two or more, and the plurality of second sub-multi-function units 122 are arranged at intervals. In addition, FIGS. 27 to 31 illustrate only one second sub-reflecting unit 112b, but in other embodiments, the number of the second sub-reflecting units 112b may be two or more, and the plurality of second sub-reflecting units 112b are arranged at intervals.

In some optional embodiments, one second multi-function unit 120b may be connected to one control circuit 610, or as shown in FIG. 18, one second multi-function unit 120b may be connected to two or more control circuits 610, so as to change the electrical load of the second multi-function unit 120b through the two or more control circuits 610, and in turn to adjust the magnitude and/or phase of the electrical load of the second multi-function unit 120b. Optionally, one second reflecting unit 112 may be connected to one control circuit 610, or one second reflecting unit 112 may be connected to two or more control circuits 610, so as to change the electrical load of the second reflecting unit 112 through the two or more control circuits 610.

Optionally, if one second multi-function unit 120b is configured to be connected to two or more control circuits 610, the second multi-function unit 120b is connected with two or more control lines 300, and the second multi-function unit 120b is connected to the control circuits 610 through the control lines 300. Alternatively, the second multi-function unit 120b is connected with two or more multi-function control feeder lines 820, and the second multi-function unit 120b is connected to the control circuits 610 through the two or more multi-function control feeder lines 820. If one second multi-function unit 120b is connected with two or more control lines 300 or multi-function control feeder lines 820, the two or more control lines 300 or multi-function control feeder lines 820 are distributed at intervals on the second multi-function unit 120b, so as to reduce the mutual effect between the two or more control lines 300 or multi-function control feeder lines 820.

Optionally, if one second reflecting unit 112 is connected to two or more control circuits 610, the second reflecting unit 112 is connected with two or more control lines 300, and the two or more control lines 300 are distributed at intervals on the second reflecting unit 112, so as to reduce the mutual effect between the two or more control lines 300.

Figure 32:
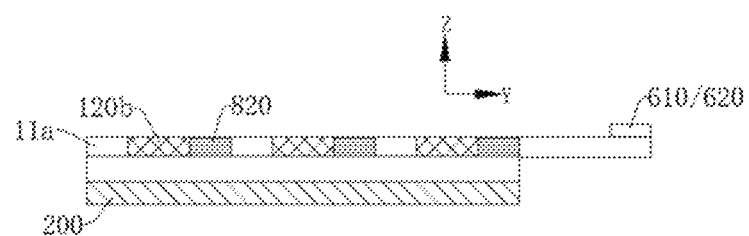
FIG. 32 shows a sectional view at A-A in FIG. 1 in yet another example.
Figure 33:
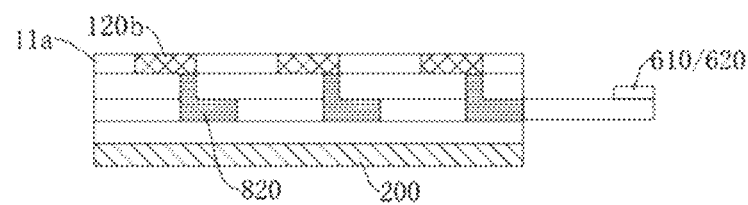
FIG. 33 shows a sectional view at A-A in FIG. 1 in yet another example.

In some optional embodiments, as shown in FIGS. 1 and 32, the display panel assembly 10 further comprises a signal line layer 11a. The multi-function unit 120 and the multi-function control feeder line 820 may be arranged in a same layer and both located in the signal line layer 11a, so as to simplify the structure of the display panel assembly 10. Alternatively, as described above, if the multi-function unit 120 and the multi-function control feeder line 820 are located in different layers, as shown in FIG. 33, the multi-function unit 120 is arranged in the signal line layer 11a, and the multi-function control feeder line 820 is arranged in another conductive layer. Alternatively, the multi-function control feeder line 820 is arranged in the signal line layer 11a, and the multi-function unit 120 is arranged in another conductive layer.

Optionally, the multi-function control feeder line 820 may be arranged in a conductive structure layer located at a side of the functional layer 100 away from the conductive layer 200, and for example, the multi-function control feeder line 820 is arranged in a signal line layer 11a which may be located at the side of the functional layer 100 away from the conductive layer 200. Alternatively, the multi-function control feeder line 820 may be arranged in a conductive structure layer located between the functional layer 100 and the conductive layer 200, and for example, the multi-function control feeder line 820 is arranged in a signal line layer 11a which may be located between the functional layer 100 and the conductive layer 200. Optionally, the second reflecting unit 112 and the multi-function unit 120 are located in a same layer, and the control line 300 connected to the second reflecting unit 112 may be located in the same layer as the multi-function control feeder line 820.

The signal line layer 11a may be set in various ways, and for example, as shown in FIG. 1, the signal line layer 11a includes grid metal wirings, and at least a portion of the metal wirings are reused as at least one of the multi-function unit 120, the multi-function control feeder line 820, the second reflecting unit 112, the control line 300, and the radio frequency line 810. The grid metal wirings include a plurality of first signal lines extending along the first direction X and a plurality of second signal lines extending along the second direction Y, and the first signal lines and the second signal lines intersect to form a grid.

If a portion of the metal wirings are reused as at least one of the multi-function unit 120, the multi-function control feeder line 820, the second reflecting unit 112, the control line 300, and the radio frequency line 810, this portion of the grid metal wirings are insulated from the metal wirings at the other locations, as to avoid short-circuit connection between adjacent ones of the multi-function unit 120, the multi-function control feeder line 820, the second reflecting unit 112, the control line 300, and the radio frequency line 810.

Figure 34:
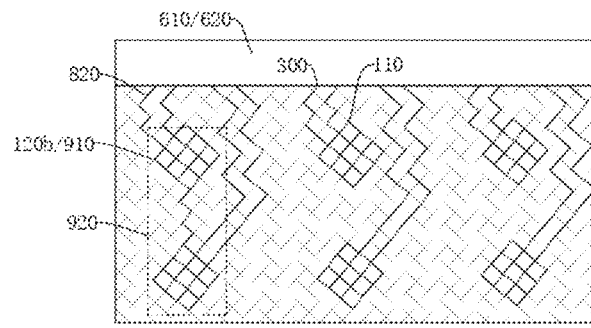
FIG. 34 shows a schematic structural diagram of a display panel assembly according to yet another embodiment of the first aspect of the present application.
Figure 35:
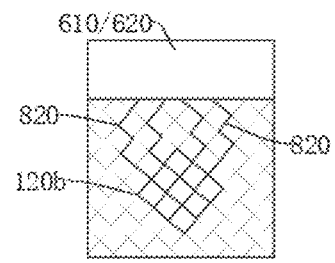
FIG. 35 shows a schematic structural diagram of a display panel assembly according to yet another embodiment of the first aspect of the present application.
Figure 36:
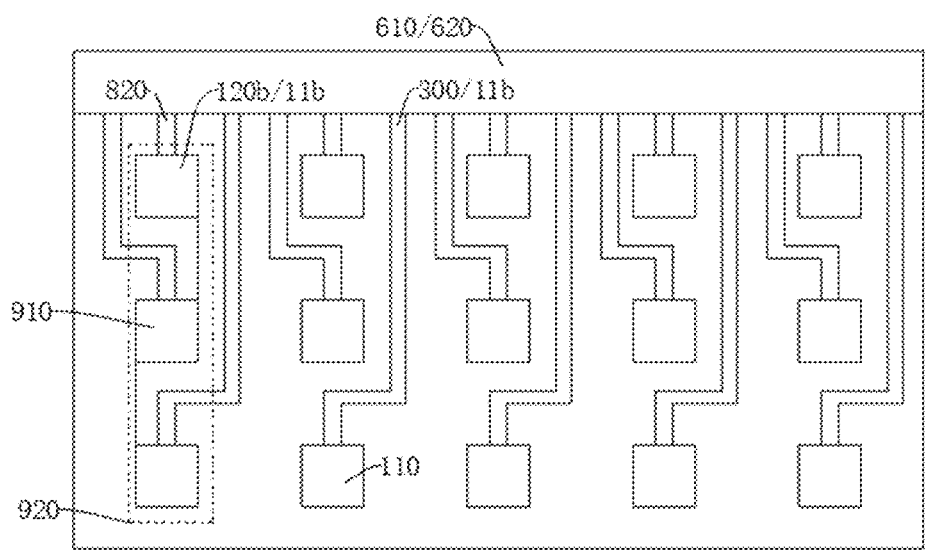
FIG. 36 shows a schematic structural diagram of a display panel assembly according to yet another embodiment of the first aspect of the present application.

Optionally, as shown in FIGS. 34 and 35, the extension direction of the grid metal wiring intersects the length direction of the display panel assembly 10. The extension direction of the grid metal wiring may be the extension direction of the first signal line or the extension direction of the second signal line. The display panel assembly 10 includes first side edges and second side edges, and two first side edges and two second side edges are alternately connected to enclose and form the display panel assembly 10. The length of the first side edge is greater than the length of the second side edge, and the extension direction of the first side edge may be the length direction of the display panel assembly 10. The extension direction of the grid metal wiring intersects the length direction of the display panel assembly 10, i.e., the extension direction of the first signal line and/or the second signal line intersects the extension direction of the first side edge, which can reduce the effect of the grid metal wirings on the display of the display panel assembly 10.

In some other optional embodiments, as shown in FIGS. 30, 31, and. 36, the display panel assembly 10 further includes a light-transmitting conductive layer 11b, and for example, the material of the light-transmitting conductive layer 11b includes a light-transmitting conductive material such as indium-tin oxide, so as to increase the light transmittance of the light-transmitting conductive layer 11b. The light-transmitting conductive layer 11b has high light transmittance and is conductive.

Optionally, at least one of the multi-function unit 120, the multi-function control feeder line 820, the second reflecting unit 112, the control line 300, the radio frequency line 810, and the conductive layer 200 is arranged in the light-transmitting conductive layer 11b, so as to reduce the effect of at least one of the multi-function unit 120, the multi-function control feeder line 820, the second reflecting unit 112, the control line 300, the radio frequency line 810, and the conductive layer 200 on the display of the display panel 10.

Optionally, the light-transmitting conductive layer 11b includes a first conductive layer and a second conductive layer that are stacked, at least one of the multi-function unit 120 and the second reflecting unit 112 is arranged in the first conductive layer, and one or more light-blocking units are arranged in the second conductive layer.

Figure 37:
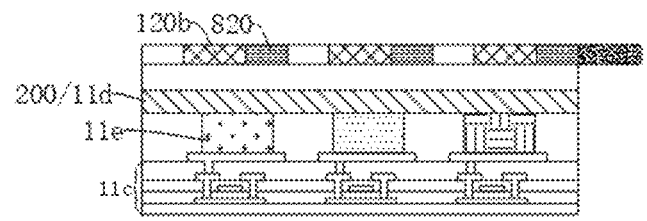
FIG. 37 shows a sectional view at A-A in FIG. 1 in yet another example.
Figure 38:
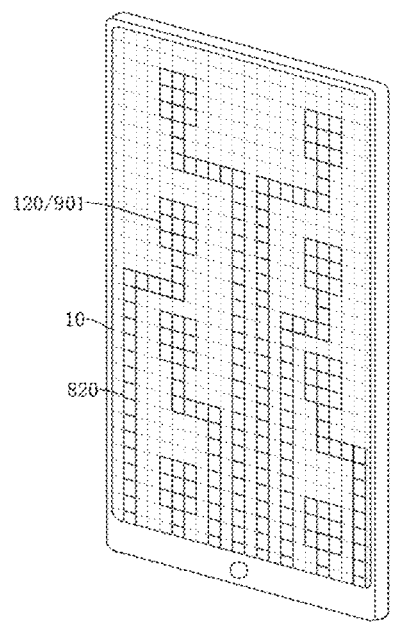
FIG. 38 shows a schematic structural diagram of a wireless communication apparatus according to an embodiment of the second aspect of the present application.
Figure 39:
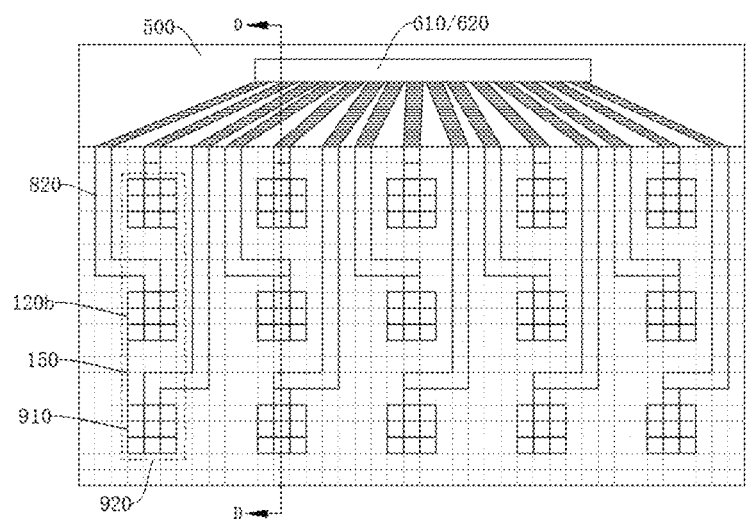
FIG. 39 shows a schematic structural diagram of a wireless communication apparatus according to another embodiment of the second aspect of the present application.
Figure 40:
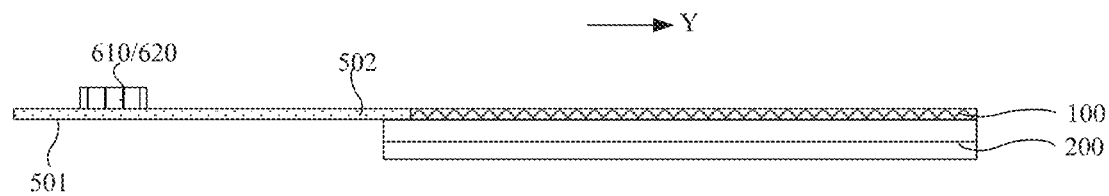
FIG. 40 shows a schematic structural diagram of a circuit board, in an unfolded state, of a wireless communication apparatus according to an embodiment of the second aspect of the present application.
Figure 41:
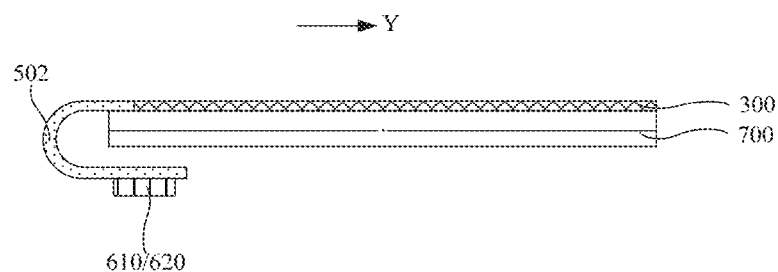
FIG. 41 shows a schematic structural diagram of a circuit board, in a folded state, of a wireless communication apparatus according to an embodiment of the second aspect of the present application.
Figure 42:
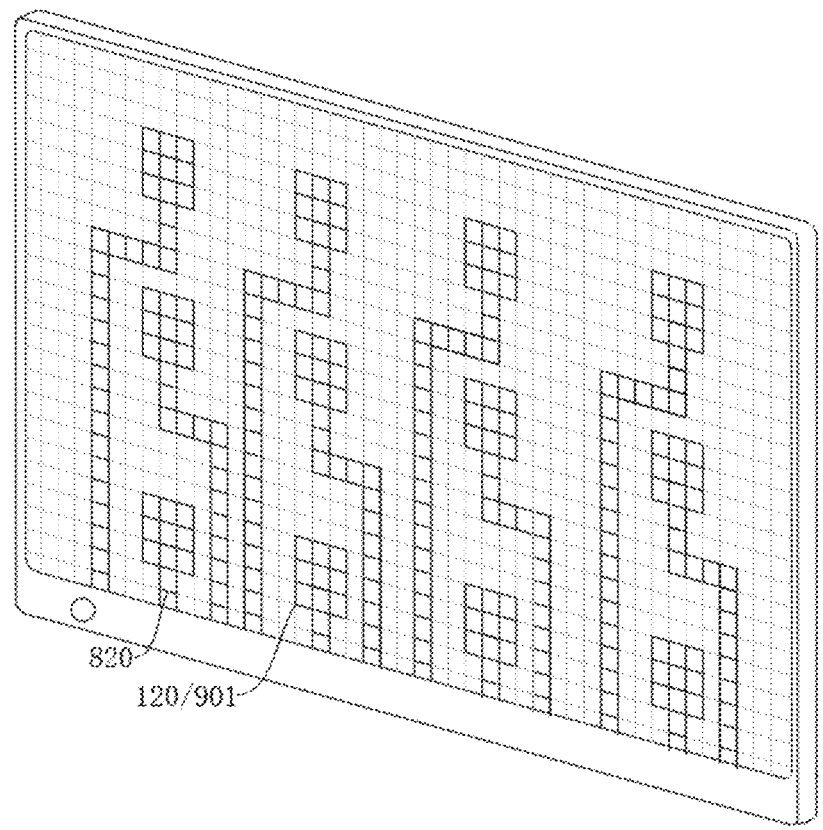
FIG. 42 shows a schematic structural diagram of a wireless communication apparatus according to yet another embodiment of the second aspect of the present application.

In some optional embodiments, as shown in FIG. 37, the display panel assembly 10 includes an array base plate 11c and a common electrode layer 11d, in which the common electrode layer 11d is located at a side of the array base plate 11c facing the display surface of the display panel assembly 10, and the common electrode layer 11d is reused as the conductive layer 200. Therefore, the conductive layer 200 can reuse the original layer structure of the display panel assembly 10, and the structure of the display panel assembly 10 can be simplified.

Optionally, the array base plate 11c includes a substrate and a driving circuit arranged on the substrate. Optionally, a planarizing layer, a pixel electrode layer, and a pixel defining layer are arranged on the base plate 11. The pixel electrode layer includes a plurality of pixel electrodes distributed in an array on the planarizing layer, the pixel defining layer is located at a side of the pixel electrode layer away from the planarizing layer and includes pixel defining portions and pixel openings enclosed by the pixel defining portions, and light-emitting units 11e may be arranged within the pixel openings. The common electrode layer 11d is arranged at a side of the pixel defining portions and the light-emitting units 11e away from the planarizing layer.

Optionally, an encapsulation layer and a touch control layer are further arranged at a side of the common electrode layer 11d away from the pixel defining layer, and the multi-function units 120 and the second reflecting units 112 may be arranged in the touch control layer, so as to further simplify the structure of the display panel assembly 10.

In the second aspect, some embodiments of the present application provide a multi-function assembly including an antenna assembly 900, an intelligent reflecting surface, and a metasurface assembly, in which the antenna assembly 900 includes one or more antenna units 901 for receiving and transmitting wireless signals; the intelligent reflecting surface includes a reflecting assembly and a conductive layer 200, the conductive layer 200 is arranged at a side of the reflecting assembly, and the reflecting assembly includes a plurality of reflecting units 110 for reflecting wireless signals; and the metasurface assembly includes a plurality of metasurface units 130 for enhancing performance of the wireless signals received and transmitted by the antenna units 901; in which at least one of the reflecting units 110 is reused as one of the metasurface unit 130 and the antenna unit 901.

In the multi-function assembly according to the embodiments of the present application, the antenna units 901 in the antenna assembly 900 can receive and transmit wireless signals, and the metasurface units 130 can enhance the performance of the wireless signals received and transmitted by the antenna units 901, so as to improve the wireless communication function of the multi-function assembly. The reflecting units 110 in the reflecting assembly can reflect wireless signals, so as to enrich the wireless communication type of the multi-function assembly. Moreover, at least one of the reflecting units 110 is reused as one of the metasurface unit 130 and the antenna unit 901, and thus the structure of the multi-function assembly can be improved.

The antenna units 901 in the antenna assembly 900, the reflecting units 110 and the conductive layer 200 of the reflecting assembly in the intelligent reflecting surface, and the metasurface units 130 in the metasurface assembly are arranged in the same manner as those described above in the display panel assembly 10 according to the first aspect, and the arrangement of the antenna units 901, the reflecting units 110, the conductive layer 200, and the metasurface units 130 in the above-described display panel assembly 10 according to the embodiments of the first aspect can be applied in the multi-function assembly according to the embodiments of the second aspect, and will not be repeated herein.

In the third aspect, some embodiments of the present application provide a wireless signal transceiver assembly including an antenna assembly 900 and a metasurface assembly, in which the antenna assembly 900 includes one or more antenna units 901 for receiving and transmitting wireless signals; and the metasurface assembly includes a plurality of metasurface units 130 for enhancing performance of the wireless signals received and transmitted by the antenna units 901, in which the antenna assembly 900 and the metasurface assembly each include a transparent structural layer.

In the wireless signal transceiver assembly according to the embodiments of the present application, the antenna units 901 in the antenna assembly 900 can receive and transmit wireless signals, and the metasurface units 130 in the metasurface assembly can enhance the performance of the wireless signals received and transmitted by the antenna units 901, so as to improve the wireless communication performance of the wireless signal transceiver assembly. Moreover, the antenna assembly 900 and the metasurface assembly each include a transparent structural layer, and thus the light transmittance of the wireless signal transceiver assembly can be increased, so that the wireless signal transceiver assembly, when used in the display panel assembly 10, will not affect the display of the display panel assembly 10.

Optionally, the transparent structural layer, the antenna units 901 in the antenna assembly 900, and the metasurface units 130 in the metasurface assembly are arranged in the same manner as those described above in the display panel assembly 10 according to the first aspect, and the arrangement of the antenna units 901 and the metasurface units 130 in the metasurface assembly in the above-described display panel assembly 10 according to the embodiments of the first aspect can be applied in the wireless signal transceiver assembly according to the embodiments of the third aspect, and will not be repeated herein.

As shown in FIGS. 38 to 42, some embodiments of the present application further provide a wireless communication apparatus including the display panel assembly 10 of any of the above embodiments of the first aspect, or the multi-function assembly of any of the above embodiments of the second aspect, or the wireless signal transceiver assembly of any of the above embodiments of the third aspect. Since the wireless communication apparatus according to the embodiments of the present application includes the display panel assembly 10, or the multi-function assembly, or the wireless signal transceiver assembly of any of the above embodiments, the wireless communication apparatus according to the embodiments of the present application has the same beneficial effects as those of the display panel assembly 10, or the multi-function assembly, or the wireless signal transceiver assembly of any of the above embodiments, which will not be repeated herein.

The wireless communication apparatus of the embodiments of the present application includes, but is not limited to, a cellular phone, a wireless wearable device, a Personal Digital Assistant (PDA), a tablet computer, an e-book, a television, an access control, a smart landline phone, a console, an electronic display board, a transparent-substrate display board, and other devices with display function.

In some optional embodiments, the wireless communication apparatus further includes the control assembly 600 which includes the radio frequency circuit 620 and the control circuit 610, and the multi-function unit 120 is controlled by the radio frequency circuit 620 and the control circuit 610 of the control assembly 600 to receive and transmit antenna signals or reflect wireless signals.

In some optional embodiments, as shown in FIGS. 38 to 42, the wireless communication apparatus further includes a circuit board 500, which may be a flexible circuit board. At least one of the control circuit 610, the millimeter wave radio frequency circuit 621, and the non-millimeter wave radio frequency circuit 622 is arranged on the circuit board 500. The circuit board 500 can support at least one of the control circuit 610, the millimeter wave radio frequency circuit 621, and the non-millimeter wave radio frequency circuit 622.

Optionally, the circuit board 500 includes a folded area 502 and a mounting area 501, in which the folded area 502 is folded so that the mounting area 501 is located at the non-display side of the display panel assembly 10, and at least one of the control circuit 610, the millimeter wave radio frequency circuit 621, and the non-millimeter wave radio frequency circuit 622 is arranged in the mounting area 501. Therefore, the number of the components located at the display side can be reduced, and the display area of the wireless communication apparatus is increased.

The number of the circuit board 500 may be set in various ways. For example, the number of the circuit board 500 may be one, and the control circuit 610, the millimeter wave radio frequency circuit 621, and the non-millimeter wave radio frequency circuit 622 are arranged on the same circuit board 500. Alternatively, the number of the circuit boards 500 is two or more, at least two of the control circuit 610, the millimeter wave radio frequency circuit 621, and the non-millimeter wave radio frequency circuit 622 are arranged on different circuit boards 500, and for example, the control circuit 610 is arranged on one of the circuit boards 500, while the millimeter wave radio frequency circuit 621 and the non-millimeter wave radio frequency circuit 622 are arranged on another of the circuit boards 500. The control circuit 610 is configured to change the electrical load of the second multi-function units 120*b*, and the control circuit 610 and the radio frequency circuit 620 being arranged on different circuit boards 500 can reduce signal crosstalk. In addition, the millimeter wave radio frequency circuit 621 and the non-millimeter wave radio frequency circuit 622 are both configured to control the second multi-function units 120*b* to receive and transmit antenna signals, and the millimeter wave radio frequency circuit 621 and the non-millimeter wave radio frequency circuit 622 being arranged on the same circuit board 500 can simplify the structure of the wireless communication apparatus.

Optionally, if the display panel assembly 10 includes the multi-function control feeder lines 820, the radio frequency circuit 620 and the control circuit 610 are both arranged on the circuit board 500. Optionally, a first signal line and a second signal line are arranged on the circuit board 500, in which the first signal line connects the multi-function control feeder lines 820 to the radio frequency circuit 620, and the second signal line connects the multi-function control feeder lines 820 to the control circuit 610. Optionally, if the radio frequency circuit 620 includes the millimeter wave radio frequency circuit 621 and the non-millimeter wave radio frequency circuit 622, the second signal line includes a first sub-line and a second sub-line, in which the first sub-line connects the multi-function control feeder lines 820 to the millimeter wave radio frequency circuit 621, and the second sub-line connects the non-millimeter wave radio frequency circuit 622 to the multi-function control feeder lines 820. Optionally, the multi-function control feeder lines 820 are arranged in the base plate 11, and for example, the multi-function control feeder lines 820 may be arranged within the base plate 11 of the display panel assembly 10, while the radio frequency circuit 620 and the control circuit 610 are arranged on the circuit board 500. The multi-function control feeder lines 820 within the display panel assembly 10 are connected to the radio frequency circuit 620 and the control circuit 610 via the first signal line and the second signal line on the flexible circuit board 500, respectively.

In some optional embodiments, as shown in FIGS. 11, 13, 16, and 23, the wireless communication apparatus further includes a baseband 700, which is configured to control the multi-function unit 120 and the control circuit 610 to be electrically connected or disconnected. If the multi-function unit 120 is reused as the reflecting unit 110 and configured to reflect wireless signals, the baseband 700 controls the multi-function unit 120 and the control circuit 610 to be electrically connected; and if the multi-function unit 120 is reused as the antenna unit 901 or the metasurface unit 130, the baseband 700 controls the multi-function unit 120 and the control circuit 610 to be electrically disconnected. Herein, the "electrically connected" and "electrically disconnected" refer to the connect and disconnect of electrical connection, when the multi-function unit 120 and the control circuit 610 are electrically connected, the control circuit 610 changes the electrical load of the multi-function unit 120, and when the multi-function unit 120 and the control circuit 610 are electrically disconnected, the control circuit 610 is not able to change the electrical load of the multi-function unit 120.

If the multi-function unit 120 is the first multi-function unit 120*a* and reused as the metasurface unit 130, the first multi-function unit 120*a* can enhance the performance of the wireless signals received and transmitted by the antenna units 901. If the multi-function unit 120 is the second multi-function unit 120*b* and reused as the antenna unit 901, the second multi-function unit 120*b* can also receive and transmit antenna signals. When the multi-function unit 120 receives and transmits antenna signals and reflects wireless signals, the magnitude of the current flowing in the multi-function unit 120 varies. Therefore, it may be determined, by comparing the currents flowing in the multi-function unit 120, that whether the multi-function unit 120 is in the operating state of the metasurface unit 130 or the antenna unit 901 or in the operating state of the reflecting unit 110.

The baseband 700 may control the multi-function unit 120 and the control circuit 610 to be electrically connected or disconnected in various ways, and for example, the baseband 700 controls the multi-function unit 120 and the control circuit 610 to be electrically connected or disconnected in accordance with a preset time sequence and time period. For example, the baseband 700 controls the multi-function unit 120 and the control circuit 610 to be electrically connected for a time period t1, then controls the multi-function unit 120 and the control circuit 610 to be electrically disconnected for a time period t2, and then controls the multi-function unit 120 and the control circuit 610 to be electrically connected for the time period t1, and so on. The time period t1 and the time period t2 may be the same or different.

Optionally, if the wireless communication apparatus includes the circuit board 500 connected with the display panel assembly 10, the baseband 700 may be arranged on the circuit board 500. The control circuit 610, the radio frequency circuit 620, and the baseband 700 may be arranged on a same circuit board 500, or at least two of the control circuit 610, the radio frequency circuit 620, and the baseband 700 may be arranged on a same circuit board 500, or the control circuit 610, the radio frequency circuit 620, and the baseband 700 may be arranged on different flexible circuit boards 500.

In some other optional embodiments, as descried above, the display panel assembly 10 further includes the second reflecting units 112, and the baseband 700 is further configured to acquire a first radio frequency operating current of the multi-function unit 120 and a second radio frequency operating current of at least one of the second reflecting units 112. The baseband 700 is further configured to control the multi-function unit 120 and the control circuit 610 to be electrically disconnected if the absolute value of the difference between the first radio frequency operating current and the second radio frequency operating current is greater than or equal to a first preset threshold.

When the multi-function unit 120 is reused as the antenna assembly 900 or the metasurface unit 130, the radio frequency operating current within the multi-function unit 120 is different from the radio frequency operating current within the second reflecting unit 112 which is only used to reflect wireless signals. In these optional embodiments, the baseband 700 can acquire the first radio frequency operating current and the second radio frequency operating current, and if the absolute value of the difference between the first radio frequency operating current and the second radio frequency operating current is greater than the first preset threshold, the radio frequency operating current of the multi-function unit 120 and the radio frequency operating current of the second reflecting unit 112 differ too much, the multi-function unit 120 is reused as the antenna assembly 900 or the metasurface unit 130, and the baseband 700 controls the multi-function unit 120 and the control circuit 610 to electrically disconnected, so as to enable the multi-function unit 120 to be in the operating mode of the antenna assembly 900.

The first preset threshold may be set according to the user's actual usage requirements, and may be determined in connection with the dynamic range of the radio frequency device connected with the antenna assembly 900 for which the multi-function unit 120 is to be reused as, the dynamic range of the radio frequency device connected with the reflecting unit 110, and the sensitivity of the baseband platform, as long as the multi-function unit 120 is determined to be currently reused as the antenna assembly 900 or the metasurface unit 130 rather than the reflecting surface assembly when the absolute value of the difference between the radio frequency currents is greater than or equal to the first preset threshold.

Optionally, the baseband 700 is further configured to control the multi-function unit 120 and the control circuit 610 to be electrically connected when the absolute value of the difference between the first radio frequency operating current and the second radio frequency operating current is less than the first preset threshold. That is, if the absolute value of the difference between the currents is less than the first preset threshold, the radio frequency operating current of the multi-function unit 120 and the radio frequency operating current of the second reflecting unit 112 do not differ too much, the multi-function unit 120 is reused as the reflecting unit 110 and reflects wireless signals together with the second reflecting unit 112, therefore the multi-function unit 120 and the control circuit 610 are electrically connected, and the control circuit 610 can control the operating state of the multi-function unit 120 when it is reused as the reflecting unit 110.

Optionally, the second radio frequency operating current acquired by the baseband 700 is the radio frequency operating current of the second reflecting unit 112 adjacent to the multi-function unit 120, i.e., the baseband 700 is configured to acquire the first radio frequency operating current of the multi-function unit 120 and the second radio frequency operating current of the second reflecting unit 112 adjacent to the multi-function unit 120. The radio frequency operating current of the second reflecting unit 112 adjacent to the multi-function unit 120 is used to determine whether the multi-function unit 120 is reused as the reflecting surface, so that the accuracy of the determination can be improved, and in turn the control accuracy of the baseband 700 is improved.

In some optional embodiments, the wireless communication apparatus further includes a low noise amplifier 720 connected between the baseband 700 and the multi-function unit 120 and/or the second reflecting unit 112, so as to reduce the effect of noise signals on the control accuracy. The baseband 700 is configured to control the multi-function unit 120 and the control circuit 610 to be electrically connected or disconnected though the low noise amplifier 720. The low noise amplifier 720 may be connected between the multi-function unit 120 and the baseband 700, or between the second reflecting unit 112 and the baseband 700, or between the multi-function unit 120 and the baseband 700 and between the second reflecting unit 112 and the baseband 700. Optionally, the wireless communication apparatus further includes a filter 710 connected between the baseband 700 and the multi-function unit 120 and/or the second reflecting unit 112.

The control circuit 610 may be set in various ways, and in some optional embodiments, the control circuit 610 includes a variable resistor 611 connected between the baseband 700 and the multi-function unit 120 and/or the second reflecting unit 112. If the control circuit 610 is configured to change the electrical load of the multi-function unit 120, the variable resistor 611 is connected between the multi-function unit 120 and the baseband 700, and the amplitude of the electrical load on the multi-function unit 120 can be adjusted by adjusting the resistance value of the variable resistor 611. If the control circuit 610 is configured to control the second reflecting unit 112, the variable resistor 611 is connected between the second reflecting unit 112 and the baseband 700, and the amplitude of the electrical load on the second reflecting unit 112 can be adjusted by changing the resistance value of the variable resistor 611.

Optionally, if the wireless communication apparatus includes the low noise amplifier 720, the variable resistor 611 may be connected between the low noise amplifier 720 and the baseband 700.

Optionally, if the wireless communication apparatus includes the circuit board 500 and the display panel assembly 10, the variable resistor 611 may be arranged in the display panel assembly 10 or the circuit board 500.

Optionally, the control circuit 610 further includes a variable capacitor 613 and/or a variable inductor 612, which are connected between the multi-function unit 120 and the variable resistor 611. The variable capacitor 613 and/or the variable inductor 612 are further connected between the second reflecting unit 112 and the variable resistor 611. If the control circuit 610 is configured to change the electrical load of the multi-function unit 120, the variable capacitor 613 and/or the variable inductor 612 are connected between the multi-function unit 120 and the variable resistor 611, and if the control circuit 610 is configured to change the electrical load of the second reflecting unit 112, the variable capacitor 613 and/or the variable inductor 612 are connected between the second reflecting unit 112 and the variable resistor 611. Characteristics such as the phase of the electrical load on the multi-function unit 120 and/or the second reflecting unit 112 can be adjusted by arranging the variable capacitor 613 and/or the variable inductor 612 within the control circuit 610.

Optionally, the control circuit 610 further comprises a second switch 614, which is configured to control the electrical connections between the variable resistor 611 and the multi-function unit 120 and/or the second reflecting unit 112. For example, the second switch 614 may be configured to control the multi-function unit 120 and/or the second reflecting unit 112 to be directly electrically connected to the variable resistor 611, or the multi-function unit 120 and/or the second reflecting unit 112 to be electrically connected to the variable resistor 611 through the variable capacitor 613, or the multi-function unit 120 and/or the second reflecting unit 112 to be electrically connected to the variable resistor 611 through the variable inductor 612.

For example, the second switch 614 is a single-pole multi-throw switch, one end of the second switch 614 is connected to the multi-function unit 120 and/or the second reflecting unit 112, and the other end of the second switch 614 is provided with three lines, in which one line is directly electrically connected to the variable resistor 611, another line is electrically connected to the variable resistor 611 through the variable capacitor 613, and the last line is electrically connected to the variable resistor 611 through the variable inductor 612. The electrical connections between the variable resistor 611 and the multi-function unit 120 and/or the second reflecting unit 112 may be determined by controlling the electrical connectivity within the second switch 614.

Optionally, the control circuit 610 further includes a down converter 615 which is connected between the variable resistor 611 and the baseband 700.

Although the present application has been described with reference to the preferred embodiments, various modifications can be made and components in the embodiments can be replaced with their equivalents, without departing from the scope of the present application. Particularly, the various technical features mentioned in the various embodiments can be combined in any manner, as long as there is no structural conflict. The present application is not limited to the particular embodiments disclosed herein, and encompasses all the technical solutions falling within the scope of the claims.

What is claimed is:

1. A display panel assembly, comprising:
   a base plate;
   an antenna assembly arranged on the base plate and comprising one or more antenna units for receiving and transmitting wireless signals;
   a metasurface assembly arranged on the base plate and comprising a plurality of metasurface units, the metasurface assembly and the antenna units being arranged in a same layer or in different layers, and the metasurface units being for enhancing performance of the wireless signals received and transmitted by the antenna units; and
   an intelligent reflecting surface comprising a reflecting assembly and a conductive layer, wherein the conductive layer is arranged at a side of the reflecting assembly facing the base plate and for blocking and reflecting wireless signals, the reflecting assembly comprises a plurality of reflecting units for reflecting wireless signals; wherein the antenna assembly and the metasurface assembly each comprise a transparent structural layer, at least one of the reflecting units is reused as at least one of the metasurface units, and/or at least one of the reflecting unit is reused as at least one of the antenna units;
   wherein when the reflecting unit is reused as the metasurface unit, the reflecting unit is able to be used as the intelligent reflecting surface to reflect wireless signals emitted from outside toward the display panel assembly, and the reflecting unit is also able to enhance the wireless signals received and transmitted by the antenna units; and when the reflecting unit is reused as the antenna unit, the reflecting unit is able to be used as the intelligent reflecting surface to reflect wireless signals emitted from outside toward the display panel assembly, and the reflecting unit is also able to receive and transmit wireless signals.

2. The display panel assembly according to claim 1, wherein the transparent structural layer is a mesh layer comprising a plurality of grid strips and a plurality of light-transmitting portions enclosed by the grid strips, or the transparent structural layer is a light-transmitting conductive layer.

3. The display panel assembly according to claim 2, wherein the plurality of light-transmitting portions is enclosed by the grid strips, and the display panel assembly further comprises:
 a pixel defining layer comprising one or more pixel defining portions and one or more pixel openings defined by the pixel defining portions, wherein the transparent structural layer is located at a side of the pixel defining layer away from the base plate, and at least a portion of an orthographic projection of the grid strip on the base plate is within an orthographic projection of the pixel defining portion on the base plate.

4. The display panel assembly according to claim 2, further comprising a conductive functional structure, wherein at least one of the antenna units and the metasurface units are arranged in the same layer as the conductive functional structure.

5. The display panel assembly according to claim 1, wherein the display panel assembly further comprises a common electrode layer, and the common electrode layer is reused as the conductive layer.

6. The display panel assembly according to claim 1, wherein at least one of the reflecting units and at least one of the metasurface units are reused as a first multi-function unit, and an orthographic projection of at least one first multi-function unit on the base plate at least partially overlaps an orthographic projection of the antenna unit on the base plate.

7. The display panel assembly according to claim 6, wherein the first multi-function unit is located at a side of the antenna unit away from the base plate.

8. The display panel assembly according to claim 6, wherein the orthographic projection of the first multi-function unit on the base plate at least partially overlaps the orthographic projection of the antenna unit on the base plate.

9. The display panel assembly according to claim 6, wherein the metasurface assembly further comprises one or more auxiliary metasurface units located at at least one side of a periphery of the first multi-function unit.

10. The display panel assembly according to claim 9, wherein an orthographic projection of the auxiliary metasurface unit on the base plate at least partially overlaps the orthographic projection of the antenna unit on the base plate.

11. The display panel assembly according to claim 9, wherein the auxiliary metasurface units and the first multi-function units are arranged in a same layer.

12. The display panel assembly according to claim 1, wherein at least one of the reflecting units and at least one of the antenna units are reused as a second multi-function unit, an orthographic projection of the second multi-function unit on the base plate at least partially overlaps an orthographic projection of the metasurface unit on the base plate, or the metasurface units are located at a periphery of the second multi-function unit.

13. The display panel assembly according to claim 12, wherein the orthographic projection of the second multi-function unit on the base plate at least partially overlaps the orthographic projection of the metasurface unit on the base plate; and
 a plurality of second multi-function units and a plurality of the metasurface units are arranged in one-to-one correspondence, or a plurality of the metasurface units are arranged corresponding to a same one of the second multi-function units.

14. The display panel assembly according to claim 12, wherein at least a portion of the metasurface units are located at a side of the second multi-function units away from the base plate, or at least a portion of the metasurface units are located at a side of the second multi-function units facing the base plate, or at least a portion of the metasurface units are located at a periphery of the second multi-function unit, and the metasurface units are arranged at the periphery of each of second multi-function units.

15. The display panel assembly according to claim 12, wherein two or more metasurface units are arranged at intervals at the periphery of each of the second multi-function units.

16. The display panel assembly according to claim 15, wherein the two or more metasurface units arranged at the periphery of each of the second multi-function units are of a same arrangement.

17. The display panel assembly according to claim 12, wherein the antenna unit comprises a millimeter wave antenna unit and a non-millimeter wave antenna unit, and the second multi-function unit is reused as the millimeter wave antenna unit or a portion of the non-millimeter wave antenna unit.

18. The display panel assembly according to claim 1, wherein at least one of the reflecting units are reused as one of the metasurface unit and the antenna unit to form a multi-function unit, the display panel assembly comprises a plurality of multi-function units and further comprises two or more functional layers, the multi-function units are arranged in the functional layers, and areas of orthographic projections of at least two of the multi-function units located in different functional layers on the base plate are different.

19. The display panel assembly according to claim 18, wherein the reflecting units comprise one or more first reflecting units and one or more second reflecting units, the first reflecting units are reused as the antenna units to form the multi-function units, and the second reflecting units are arranged in the functional layers.

20. A multi-function assembly, comprising:
 an antenna assembly comprising one or more antenna units for receiving and transmitting wireless signals;
 an intelligent reflecting surface comprising a reflecting assembly and a conductive layer, wherein the conductive layer is arranged at a side of the reflecting assembly and for blocking and reflecting wireless signals, and the reflecting assembly comprises a plurality of reflecting units for reflecting wireless signals; and
 a metasurface assembly, the metasurface assembly and the antenna units being arranged in a same layer or in different layers, and the metasurface assembly comprising a plurality of metasurface units for enhancing performance of the wireless signals received and transmitted by the antenna units, wherein at least one of the reflecting units is reused as one of the metasurface unit and the antenna unit, when the reflecting unit is reused as the metasurface unit, the reflecting unit is able to be used as the intelligent reflecting surface to reflect wireless signals emitted from outside toward a display panel assembly, and the reflecting unit is also configured to:

enhance the wireless signals received and transmitted by the antenna units, and, when the reflecting unit is reused as the antenna unit, reflect wireless signals emitted from outside toward the display panel assembly, and receive and transmit wireless signals.

\* \* \* \* \*